United States Patent
Lee et al.

(10) Patent No.: US 10,527,831 B2
(45) Date of Patent: Jan. 7, 2020

(54) CLOAKING DEVICES WITH PLANAR AND CURVED MIRRORS AND VEHICLES COMPRISING THE SAME

(71) Applicant: Toyota Motor Engineering & Manufacturing North America, Inc., Erlanger, KY (US)

(72) Inventors: Kyu-Tae Lee, Ann Arbor, MI (US); Debasish Banerjee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 204 days.

(21) Appl. No.: 15/700,740

(22) Filed: Sep. 11, 2017

(65) Prior Publication Data

US 2019/0079276 A1    Mar. 14, 2019

(51) Int. Cl.
*G02B 17/06*    (2006.01)
*B62D 25/04*    (2006.01)

(52) U.S. Cl.
CPC ............ *G02B 17/06* (2013.01); *B62D 25/04* (2013.01); *G02B 17/0615* (2013.01)

(58) Field of Classification Search
None
See application file for complete search history.

(56) References Cited

U.S. PATENT DOCUMENTS 3,647,284 A * 3/1972 Elings ................. G02B 17/008
359/858
4,118,274 A * 10/1978 Bakken .................... G21B 1/23
376/104

(Continued)

FOREIGN PATENT DOCUMENTS

JP    2010139997 A    6/2010

OTHER PUBLICATIONS

"Metamaterials and the science of invisibility", published Jun. 22, 2014; URL: http://thequantumtunnel.com/metamaterials-science-invisibility-continuum/.

(Continued)

*Primary Examiner* — Jennifer D. Carruth
(74) *Attorney, Agent, or Firm* — Dinsmore & Shohl LLP

(57) ABSTRACT

A cloaking device includes an object-side, an image-side and an apex axis extending from the object-side to the image-side. An object-side cloaking region (CR) planar reflection boundary having an outward facing mirror surface and an inward facing surface, and an image-side CR planar reflection boundary having an outward facing mirror surface and an inward facing surface, are included. A cloaking region is bounded by inward facing surfaces of the object-side CR planar reflection boundary and the image-side CR planar reflection boundary. At least one exterior curved reflection boundary with an inward facing mirror surface is spaced apart from the object-side CR planar reflection boundary and the image-side CR planar reflection boundary. A centrally positioned planar reflection boundary with an outward facing mirror surface is positioned between the objects-side and image-side CR planar reflection boundaries and faces the inward facing mirror surface of the at least one exterior curved reflection boundary.

20 Claims, 8 Drawing Sheets

(56) References Cited

U.S. PATENT DOCUMENTS

| | | | | |
|---|---|---|---|---|
| 4,886,348 A * | 12/1989 | Schmertz | ........... | G02B 17/0668 |
| | | | | 359/861 |
| 5,392,161 A * | 2/1995 | Weder | .................... | A63H 33/22 |
| | | | | 359/861 |
| 7,643,128 B2 | 1/2010 | Harned et al. | | |
| 8,165,434 B2 * | 4/2012 | Bourget | ............... | G02B 6/0006 |
| | | | | 362/296.01 |
| 8,462,436 B2 * | 6/2013 | Tilford | ................. | G02B 27/145 |
| | | | | 359/577 |
| 8,659,823 B2 | 2/2014 | Mercado | | |
| 9,557,547 B2 | 1/2017 | Choi et al. | | |
| 9,971,162 B2 * | 5/2018 | Banerjee | ................ | G02B 27/14 |
| 10,161,720 B2 * | 12/2018 | Banerjee | ................... | F41H 3/00 |
| 2009/0147335 A1 * | 6/2009 | Schumm, Jr. | ........ | G02B 17/061 |
| | | | | 359/33 |
| 2010/0309566 A1 * | 12/2010 | DeWitt | ................. | G02B 5/001 |
| | | | | 359/729 |
| 2015/0183375 A1 | 7/2015 | Wu | | |
| 2015/0248013 A1 * | 9/2015 | Chen | ..................... | H01Q 15/08 |
| | | | | 359/625 |
| 2018/0147992 A1 * | 5/2018 | Banerjee | ................... | B60R 1/10 |
| 2019/0033565 A1 * | 1/2019 | Lee | .................... | G02B 17/0621 |
| 2019/0143897 A1 * | 5/2019 | Lee | ......................... | B60R 1/007 |

OTHER PUBLICATIONS

U.S. Appl. No. 15/185,988, filed Jun. 17, 2016; Inventors: Debasish Banerjee, Hideo Iizuka.

Banerjee, Debasish et al., "Invisibility cloak with image projection capability", Sci. Rep., 6: 38965 (2016).

* cited by examiner

US 10,527,831 B2

CLOAKING DEVICES WITH PLANAR AND CURVED MIRRORS AND VEHICLES COMPRISING THE SAME

TECHNICAL FIELD

The present specification generally relates to apparatuses and methods for making an object appear transparent and, more specifically, to cloaking devices for pillars of vehicles and methods for making pillars of vehicles appear transparent.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side and an apex axis extending from the object-side to the image-side. An object-side cloaking region (CR) planar reflection boundary having an outward facing mirror surface and an inward facing surface, and an image-side CR planar reflection boundary having an outward facing mirror surface and an inward facing surface, are included. A cloaking region is bounded by inward facing surfaces of the object-side CR planar reflection boundary and the image-side CR planar reflection boundary. At least one exterior curved reflection boundary with an inward facing mirror surface is spaced apart from the object-side CR planar reflection boundary and the image-side CR planar reflection boundary. A centrally positioned planar reflection boundary with an outward facing mirror surface is positioned between the objects-side and image-side CR planar reflection boundaries and faces the inward facing mirror surface of the at least one exterior curved reflection boundary. In embodiments, the at least one exterior curved reflection boundary includes an object-side inward facing parabolic mirror surface positioned proximate to and facing the outward facing mirror surface of the object-side CR planar reflection boundary and an image-side inward facing parabolic mirror surface positioned proximate to and facing the outward facing mirror surface of the image-side CR planar reflection boundary. The centrally positioned planar reflection boundary may be oriented 45° relative to the object-side CR planar reflection boundary and the image-side CR planar reflection boundary may be oriented 45° relative to the centrally positioned planar reflection boundary.

In another embodiment, a cloaking device assembly includes an object-side, an image-side, an apex axis extending from the object side to the image side, a pair of object-side cloaking region (CR) planar reflection boundaries and a pair of image-side CR planar reflection boundaries are included. The pair of object-side CR planar reflection boundaries includes a first object-side CR planar reflection boundary positioned on a first side of the apex axis and a second object-side CR planar reflection boundary positioned on a second side of the apex axis opposite the first side. The pair of image-side CR planar reflection boundaries includes a first image-side CR reflection boundary positioned on the first side of the apex axis and a second image-side CR planar reflection boundary positioned on the second side of the apex axis opposite the first side. Each of the pair of object-side CR planar reflection boundaries and each of the pair of image-side CR planar reflection boundaries includes an outward facing mirror surface and an inward facing surface. A cloaking region is bounded by the inward facing surfaces of the pair of object-side CR planar reflection boundaries and the pair of image-side CR planar reflection boundaries. At least one pair of exterior curved reflection boundaries are included with a first exterior curved reflection boundary positioned on the first side of the apex axis and a second exterior curved reflection boundary positioned on the second side of the apex axis opposite the first side. Each of the at least one pair of exterior curved reflection boundaries includes an inward facing mirror surface spaced apart from one of the object-side CR planar reflection boundaries and one of the image-side CR planar reflection boundaries. A pair of centrally positioned planar reflection boundaries are included with a first centrally positioned planar reflection boundary positioned on the first side of the apex axis and a second centrally positioned planar reflection boundary positioned on the second side of the apex axis opposite the first side. Each of the pair of centrally positioned planar reflection boundaries includes an outward facing mirror surface facing the inward facing mirror surface of the at least one pair of exterior curved reflection boundaries.

In still another embodiment, a vehicle includes an A-pillar and a cloaking assembly with an object-side and an image-side. The cloaking assembly includes an object-side cloaking region (CR) planar reflection boundary with an outward facing mirror surface and an inward facing surface, and an image-side CR planar reflection boundary with an outward facing mirror surface and an inward facing surface. A cloaking region is bounded by the inward facing surfaces of the object-side CR planar reflection boundary and the image-side CR planar reflection boundary. The A-pillar is positioned within the cloaking region. At least one exterior curved reflection boundary with an inward facing mirror surface is spaced apart from the object-side CR planar reflection boundary and the image-side CR planar reflection boundary. A centrally positioned planar reflection boundary with an outward facing mirror surface is positioned between the object-side and image-side CR planar reflection boundaries. In embodiments, the at least one exterior curved reflection boundary includes an object-side inward facing parabolic mirror surface positioned proximate to and facing the outward facing mirror surface of the object-side CR planar reflection boundary and an image-side inward facing parabolic mirror surface positioned proximate to and facing the outward facing mirror surface of the image-side CR planar reflection boundary. The centrally positioned planar reflection boundary may be oriented 45° from the object-side CR planar reflection boundary and the image-side CR planar reflection boundary may be oriented 45° from the centrally positioned planar reflection boundary.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of planar mirrors and a curved mirror which direct incoming light around a cloaking region. The cloaking devices described herein may utilize concave mirrors, parabolic mirrors and planar mirrors to reflect, focus, diverge and re-focus light from an object. Cloaking devices described herein may be used to cloak vehicle articles such as vehicle A-pillars, B-pillars, C-pillars, D-pillars, etc., and remove a "blind spot" caused by the vehicle article. A blind spot refers to a region of the vehicle where an occupant's view may be obstructed. The utilization of the curved mirrors allows a driver to perceive an image which, if not for the cloaking device, would be obstructed by a pillar of the vehicle. Various embodiments of cloaking devices and methods for using the same will be described in further detail herein with specific reference to the appended drawings.

Figure 1:
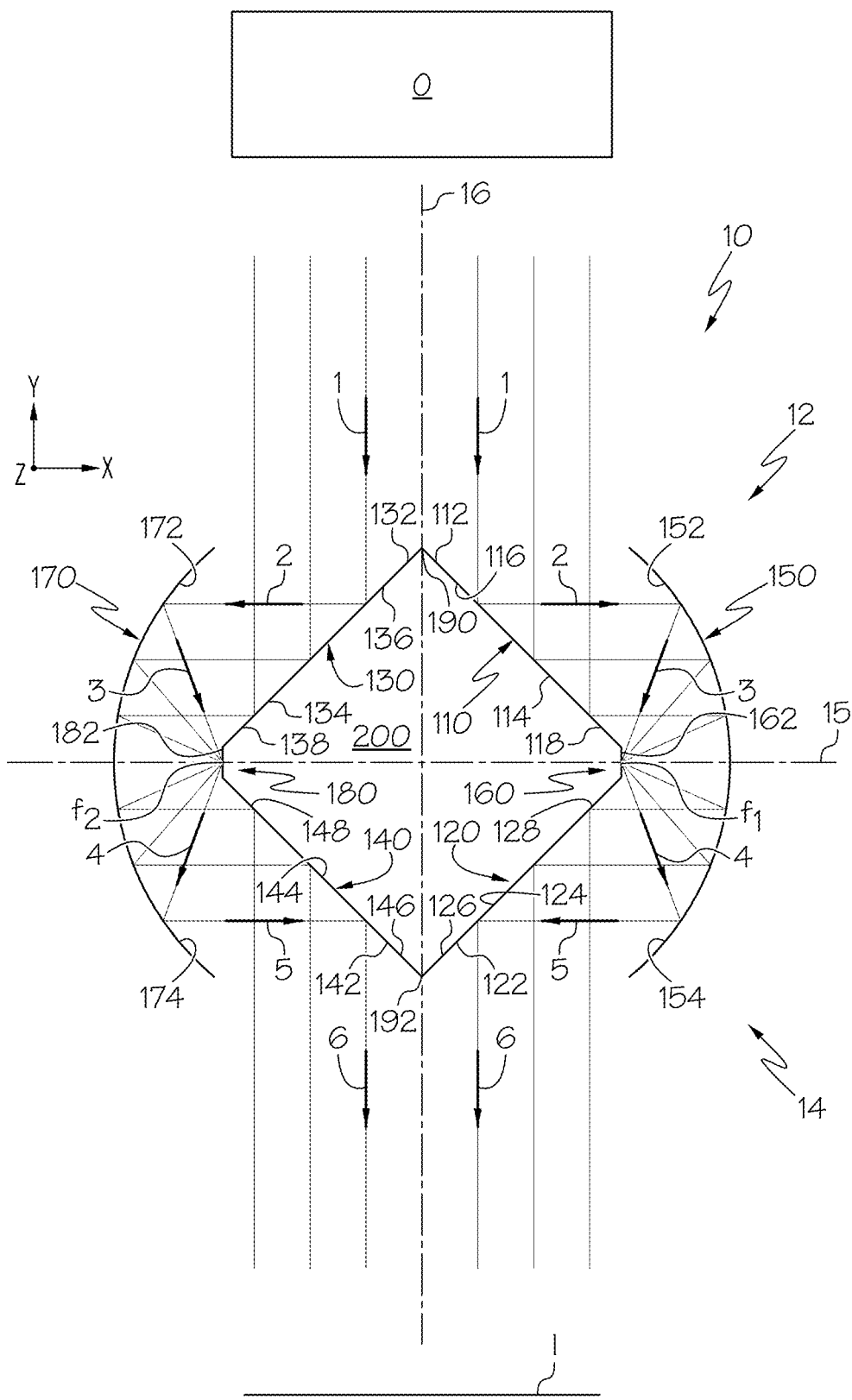
FIG. 1 schematically depicts a top view of a cloaking device according to one or more embodiments disclosed and described herein.

FIG. 1 generally depicts one embodiment of a cloaking device. The cloaking device includes a cloaking region (CR) that is at least partially bounded by at least two CR planar reflection boundaries, at least one exterior curved reflection boundary spaced apart from the at least two CR planar reflection boundaries and at least one centrally positioned planar reflection boundary positioned between the at least two CR planar reflection boundaries. As used herein, the terms "boundaries" and "boundary" refer to a physical surface. The term "exterior" refers to a boundary or mirror surface spaced apart from, i.e., positioned a predetermined distance from, one of the CR planar reflection boundaries. One of the CR planar reflection boundaries may be an object-side CR planar reflection boundary and another of the CR planar reflection boundaries may be an image-side CR planar reflection boundary. The at least one exterior curved reflection boundary comprises an inward facing mirror surface spaced apart from the object-side CR planar refection boundary (referred to herein as an "object-side inward facing mirror surface") and an inward facing mirror surface spaced apart from the image-side CR planar reflection boundary (referred to herein as an "image-side inward facing mirror surface").

The object-side CR planar reflection boundary is oriented to reflect incident light in parallel from an object positioned on an object-side of the cloaking device onto the object-side inward facing mirror surface. As used herein, the phrase "in parallel" refers to light rays (light) propagating in space parallel to each other. The object-side inward facing mirror surface of the at least one exterior curved reflection boundary is oriented to reflect and focus incident light from the object-side CR planar reflection boundary onto the centrally positioned planar reflection boundary. The centrally positioned planar reflection boundary is oriented to reflect incident light from the object-side inward facing mirror surface onto the image-side inward facing mirror surface of the at least one exterior curved reflection boundary. The image-side inward facing mirror surface of the at least one exterior curved reflection boundary is oriented to reflect and focus incident light from the centrally positioned planar reflection boundary in parallel onto the image-side CR planar reflection boundary. The image-side CR planar reflection boundary is oriented to reflect incident light reflected from the image-side inward facing mirror surface of the at least one exterior curved reflection boundary in parallel and provide an image on the image side of the cloaking device.

Still referring to FIG. 1, embodiments of a cloaking device include a cloaking assembly 10 with an object-side 12, an image-side 14 and four CR planar reflection boundaries 10, 120, 130, 140. The object side 12 is positioned above (+Y direction) a bisecting axis 15 and the image-side 14 is positioned below (−Y direction) the bisecting axis 15. That is, the bisecting axis 15 extends between and delineates the object-side 12 and the image-side 14. Each of the four CR planar reflection boundaries 110, 120, 130, 140 has a length along the X-axis, a width along the Y-axis and a height along the Z-axis shown in the figures. That is, the X-axis shown in the figures extends along a length of the four CR planar reflection boundaries 110, 120, 130, 140, the Y-axis shown in the figures extends along a width of the four CR planar reflection boundaries 110, 120, 130, 140, and the Z-axis shown in the figures extends along a height of the four CR planar reflection boundaries 110, 120, 130, 140. The two CR planar reflection boundaries 110, 130 may be positioned on the object-side 12 of the cloaking assembly 10 to face an object 'O' and may be referred to herein as object-side CR planar reflection boundaries 110, 130. The two CR planar reflection boundaries 120, 140 may be positioned on the image-side 14 of the cloaking assembly 10 to provide an image 'I' formed by the cloaking assembly 10 and may be referred to herein as image-side CR planar reflection boundaries 120, 140.

The CR planar reflection boundaries 110, 120, 130, 140 each have an outward facing mirror surface 112, 122, 132, 142 and an inward facing surface 114, 124, 134, 144, respectively. The term "outward" used herein refers to a surface that faces away and/or reflects light away from a cloaking region 200 and the term "inward" used herein refers to a surface that faces towards and/or reflects light towards the cloaking region 200. In embodiments, one or more of the inward facing surfaces 114, 124, 134, 144 may be an opaque surface, a mirror surface or a transparent surface. The outward facing mirror surfaces 112, 122, 132, 142 can be made from omnidirectional photonic crystals or mirrors such that light incident on the outward facing mirror surfaces 112, 122, 132, 142 is reflected there from. As used herein, the term "mirror surface" refers to a surface that reflects all modes of light (e.g. s-polarized light and p-polarized light) incident on the mirror surface. Also, as used herein the term "reflected there from" refers to at least 50% of incident light being reflected from a surface. In some embodiments, at least 60% of incident light is reflected from the surface, while in other embodiments at least 70% of incident light is reflected from the surface. In still other embodiments, at least 80% of incident light, for example at least 90% of incident light is reflected from the surface.

The CR planar reflection boundaries 110, 120, 130, 140 may have an apex end 116, 126, 136, 146 and a side end 118, 128, 138, 148, respectively. The side ends 118, 128, 138, 148 are spaced apart from the apex ends 116, 126, 136, 146, respectively, and the CR planar reflection boundaries 110, 120, 130, 140 extend between apex ends 116, 126, 136, 146 and side ends 118, 128, 138, 148, respectively. In embodiments, the apex ends 116, 136 of the two object-side CR planar reflection boundaries 110, 130, respectively, meet or intersect at an apex 190, and in the alternative or in addition to, the apex ends 126, 146 of the two image-side CR planar reflection boundaries 120, 140, respectively, meet or intersect at an apex 192. In such embodiments, an apex axis 16 bisects the apex 190 and the apex 192, and may be a centerline between a right hand side (+X direction) and a left hand side (−X direction) of the cloaking assembly 10. In other embodiments, the apex ends 116, 136 of the two object-side CR planar reflection boundaries 110, 130, respectively, are spaced apart from each other and the apex ends 126, 146 of the two image-side CR planar reflection boundaries 120, 140, respectively, are spaced apart from each other such that a uncloaked region or gap (not shown) is present between the spaced apart apex ends 116, 136 and spaced apart apex ends 126, 146. In such embodiments, an image of the portion of the object O positioned above (+Y direction) the uncloaked region is not provided on the image side 14 of the cloaking assembly 10.

In embodiments, the side end 118 may be positioned adjacent to and may be joined to side end 128 and the side end 138 may be positioned adjacent to and may be joined to side end 148. In other embodiments, the side ends 118, 138 may be spaced apart (Y direction) from the side ends 128, 148 as depicted in FIG. 1.

In embodiments, the two object-side CR planar reflection boundaries 110, 130 and the two image-side CR planar reflection boundaries 120, 140 form the cloaking region 200 that is bound at least partly by the inward facing surfaces 114, 134, 124, 144. The two object-side CR planar reflection boundaries 110, 130 and the two image-side CR planar reflection boundaries 120, 140 have a height 'h' (FIG. 6) in the Z-direction of the coordinate axes in the figures and light reflected or transmitted within the cloaking region 200 does not pass through the inward facing surfaces 114, 134, 124, 144. Accordingly, an article located within the cloaking region 200 (e.g., a cloaked article) is not visible to an observer viewing the cloaking assembly 10 from the image-side 14 in the +Y direction.

Still referring to FIG. 1, an exterior curved reflection boundaries 150 is spaced apart from the CR planar reflection boundaries 110, 120 and an exterior curved reflection boundary 170 is spaced apart from the CR planar reflection boundaries 130, 140. The exterior curved reflection boundary 150 includes an object-side inward facing mirror surface 152 facing the outward facing mirror surface 112 of the object-side CR planar reflection boundary 110 and an image-side inward facing mirror surface 154 facing the outward facing mirror surface 122 of the image-side CR planar reflection boundary 120. The exterior curved reflection boundary 170 includes an object-side inward facing mirror surface 172 facing the outward facing mirror surface 132 of the object-side CR planar reflection boundary 130 and an image-side inward facing mirror surface 174 facing the outward facing mirror surface 142 of the image-side CR planar reflection boundary 140. In some embodiments, the object-side inward facing mirror surface 152 and the image-side inward facing mirror surface 154 may be a single inward facing mirror surface. That is, a single inward facing mirror surface comprising the object-side inward facing mirror surface 152 and the image-side inward facing mirror surface 154 may extend along an inner surface of the exterior curved reflection boundary 150. In other embodiments, the object-side inward facing mirror surface 152 and the image-side inward facing mirror surface 154 are two separate and distinct inward facing mirror surfaces. Similarly, the object-side inward facing mirror surface 172 and the image-side inward facing mirror surface 174 may be a single inward facing mirror surface. In the alternative, the object-side inward facing mirror surface 172 and the image-side inward facing mirror surface 174 may be two separate and distinct inward facing mirror surfaces.

Positioned between the object-side CR planar reflection boundary 110 and the image-side CR planar reflection boundary 120 is a centrally positioned planar reflection boundary 160 with an outward facing mirror surface 162. The outward facing mirror surface 162 faces the object-side inward facing mirror surface 152 and the image-side inward facing mirror surface 154 of the exterior curved reflection boundary 150. In embodiments, the object-side CR planar reflection boundary 110 is oriented 45° relative to the apex axis 16, the centrally positioned planar reflection boundary 160 is oriented 45° relative to the object-side CR planar reflection boundary 110, and the image-side CR planar reflection boundary 120 is oriented 45° relative to the centrally positioned planar reflection boundary 160 and the apex axis 16. In such embodiments, the image-side CR planar reflection boundary 120 is oriented 90° relative to the object-side CR planar reflection boundary 110 and the centrally positioned planar reflection boundary 160 is oriented parallel to the apex axis 16. In other embodiments, the object-side CR planar reflection boundary 110 is not oriented 45° relative to the apex axis 16, the centrally positioned planar reflection boundary 160 is not oriented 45° relative to the object-side CR planar reflection boundary 110, and the image-side CR planar reflection boundary 120 is not oriented 45° relative to the centrally positioned planar reflection boundary 160 and the apex axis 16. For example, the object-side CR planar reflection boundary 110 may be oriented 30° relative to the apex axis 16, the centrally positioned planar reflection boundary 160 is oriented 30° relative to the object-side CR planar reflection boundary 110, and the image-side CR planar reflection boundary 120 is oriented 30° relative to the centrally positioned planar reflection boundary 160 and the apex axis 16. In such embodiments, the image-side CR planar reflection boundary 120 is oriented 120° relative to the object-side CR planar reflection boundary 110 and the centrally positioned planar reflection boundary 160 is oriented parallel to the apex axis 16.

Positioned between the object-side CR planar reflection boundary 130 and the image-side CR reflection boundary 140 is a centrally positioned planar reflection boundary 180 with an outward facing mirror surface 182. The outward facing mirror surface 182 faces the object-side inward facing mirror surface 172 and the image-side inward facing mirror surface 174 of the exterior curved reflection boundary 170. In embodiments, the object-side CR planar reflection boundary 130 is oriented 45° relative to the apex axis 16, the centrally positioned planar reflection boundary 180 is oriented 45° relative to the object-side CR planar reflection boundary 130, and the image-side CR planar reflection boundary 140 is oriented 45° relative to the centrally positioned planar reflection boundary 180 and the apex axis 16. In such embodiments, the image-side CR planar reflection boundary 140 is oriented 90° relative to the object-side CR planar reflection boundary 130 and the centrally positioned planar reflection boundary 180 is oriented parallel to the apex axis 16. In other embodiments, the object-side CR planar reflection boundary 130 is not oriented 45° relative to the apex axis 16, the centrally positioned planar reflection boundary 180 is not oriented 45° relative to the object-side CR planar reflection boundary 130, and the image-side CR planar reflection boundary 140 is not oriented 45° relative to the centrally positioned planar reflection boundary 180 and the apex axis 16. For example, the object-side CR planar reflection boundary 130 may be oriented 30° relative to the apex axis 16, the centrally positioned planar reflection boundary 180 is oriented 30° relative to the object-side CR planar reflection boundary 130, and the image-side CR planar reflection boundary 140 is oriented 30° relative to the centrally positioned planar reflection boundary 180 and the apex axis 16. In such embodiments, the image-side CR planar reflection boundary 140 is oriented 120° relative to the object-side CR planar reflection boundary 130 and the centrally positioned planar reflection boundary 180 is oriented parallel to the apex axis 16.

In embodiments the centrally positioned planar reflection boundaries 160, 180 are positioned on the bisecting axis 15 that extends between and delineates the object-side 12 and the image-side 14. In such embodiments, the outward facing mirror surface 162 may be spaced apart from the object-side inward facing mirror surface 152 and the image-side inward facing mirror surface 154, and the outward facing mirror surface 182 may be spaced apart from the object-side inward facing mirror surface 172 and the image-side inward facing mirror surface 174. The centrally positioned planar reflection boundaries 160, 180 may be positioned adjacent to the side ends 118, 128 and side ends 138, 148, respectively. Also, the outward facing mirror surfaces 162, 182 of the centrally positioned planar reflection boundaries 160, 180, respectively, are generally parallel to the apex axis 16 that bisects the apex 190 and the apex 192. In the alternative or in addition to, the outward facing mirror surfaces 162, 182 of the centrally positioned planar reflection boundaries 160, 180 may be generally parallel to light 1.

The exterior curved reflection boundary 150 is positioned relative to the object-side CR planar reflection boundary 110 such that light from the object O (shown as arrow '1' in FIG. 1) incident on the cloaking assembly 10 on the right hand side (+X direction) of the apex axis 16 is reflected by the outward facing mirror surface 112 onto the object-side inward facing mirror surface 152 (shown as arrow '2' in FIG. 1). In embodiments, light 2 is reflected in parallel from the outward facing mirror surface 112 onto the object-side inward facing mirror surface 152. The centrally positioned planar reflection boundary 160 is positioned relative to the object-side inward facing mirror surface 152 such that light 2 from the outward facing mirror surface 112 is reflected and focused by the object-side inward facing mirror surface 152 onto the outward facing mirror surface 162 (shown as arrow '3' in FIG. 1). In embodiments, light 3 is focused to a focal line $f_1$ and the outward facing mirror surface 162 is positioned at the focal line $f_1$. That is, light 3 incident on the object-side inward facing mirror surface 152 along the height h (Z-direction) of the exterior curved reflection boundary 150 may be generally focused to a line (focal line $f_1$) extending in the Z-direction. It should be understood that the focal line $f_1$, and other focal lines described herein, are provided by the curvature of a given mirror surface. For example, the focal line $f_1$ is due to or provided by the curvature of the object-side inward facing mirror surface 152.

The exterior curved reflection boundary 150 is positioned relative to the centrally positioned planar reflection boundary 160 such that light 3 reflected by and diverging from the outward facing mirror surface 162 is incident on the image-side inward facing mirror surface 154 (shown as arrow '4' in FIG. 1). The image-side CR planar reflection boundary 120 is positioned relative to the exterior curved reflection boundary 150 such that light 4 reflected and focused by the image-side inward facing mirror surface 154 is incident on the outward facing mirror surface 122 (shown as arrow '5' in FIG. 1). In embodiments, light 5 is reflected in parallel and focused by the image-side inward facing mirror surface 154 onto the outward facing mirror surface 122. The image-side CR planar reflection boundary 120 is positioned relative to the image-side inward facing mirror surface 154 such that light 5 is reflected in parallel and forms a portion of the Image I on the right hand side (+X direction) of the apex axis 16.

The exterior curved reflection boundary 170 is positioned relative to the object-side CR planar reflection boundary 130 such that light 1 from the object O incident on the cloaking assembly 10 on the left hand side (−X direction) of the apex axis 16 is reflected by the outward facing mirror surface 132 as light 2 onto the object-side inward facing mirror surface 172. In embodiments, light 2 is reflected in parallel by the outward facing mirror surface 132 onto the object-side inward facing mirror surface 172. The centrally positioned planar reflection boundary 180 is positioned relative to the object-side inward facing mirror surface 172 such that light 2 from the outward facing mirror surface 132 is reflected and focused by the object-side inward facing mirror surface 172 as light 3 onto the outward facing mirror surface 182. In embodiments, light 3 is focused to a focal line $f_2$ and the outward facing mirror surface 182 is positioned at the focal line $f_2$. That is, light 3 incident on the object-side inward facing mirror surface 172 along the height h (Z-direction) of the exterior curved reflection boundary 170 may be generally focused to a line (focal line $f_2$) extending in the Z-direction.

The exterior curved reflection boundary 170 is positioned relative to the centrally positioned planar reflection boundary 180 such that light 3 reflected by and diverging from the outward facing mirror surface 182 (light 4) is incident on the image-side inward facing mirror surface 174. The image-side CR planar reflection boundary 140 is positioned relative to the exterior curved reflection boundary 170 such that light 4 reflected and focused by the image-side inward facing mirror surface 174 (light 5) is incident on the outward facing mirror surface 142. In embodiments, light 5 is reflected in parallel and focused by the image-side inward facing mirror surface 174 onto the outward facing mirror surface 142. The image-side CR planar reflection boundary 140 is positioned relative to the image-side inward facing mirror surface 174 such that light 5 is reflected in parallel as light 6 and forms a portion of the Image I on the left hand side (−X direction) of the apex axis 16.

As noted above, the object-side inward facing mirror surface 152 may have a curvature to focus incident light 1 to the focal line $f_1$ and the image-side inward facing mirror surface 154 may have a curvature to focus incident light 4 to propagate in parallel to the outward facing mirror surface 122. Also, the object-side inward facing mirror surface 172 may have a curvature to focus incident light 1 to the focal line $f_2$ and the image-side inward facing mirror surface 174 may have a curvature to focus incident light 4 to propagate in parallel to the outward facing mirror surface 142. For example and without limitation, the inward facing mirror surfaces 152, 154, 172 and/or 174 may have a curved shape described by the expression:

$$y = \frac{x^2}{R\left(1 + \sqrt{1 - (1+K)\left(\frac{K^2}{R^2}\right)}\right)} \quad (1)$$

where R is the radius of curvature of the inward facing mirror surfaces 152, 154, 172, 174. In embodiments, the curved shape is parabolic, K=−1 and expression (1) reduces to:

$$y = \frac{x^2}{2R} = Ax^2 \quad (2)$$

where A=1/(2R) is a constant. It should be understood that the radius of curvature R may be constant along the height h (Z-direction) of the inward facing mirror surfaces 152, 154, 172 and/or 174.

Still referring to FIG. 1, the object-side inward facing mirror surface 152 of the exterior curved reflection boundary 150 is positioned outward in the +X direction relative to the object-side CR planar reflection boundary 110 and the centrally positioned planar reflection boundary 160 such that light 2 incident on the object-side inward facing mirror surface 152 is focused to the focal line $f_1$ on the outward facing mirror surface 162 as light 3. The image-side inward facing mirror surface 154 of the exterior curved reflection boundary 150 is positioned in the +X direction relative to the centrally positioned planar reflection boundary 160 and the image-side CR planar reflection boundary 120 such that light 4 reflected by and diverging from the outward facing mirror surface 162 is reflected and focused by the image-side inward facing mirror surface 154 as light 5. In embodiments, light 4 is focused by the image-side inward facing mirror surface 154 such that light 5 propagates in parallel and is incident on the outward facing mirror surface 122. In embodiments, the curvature of the object-side inward facing mirror surface 152 is the same as the curvature of the image-side inward facing mirror surface 154. In other embodiments, the curvature of the object-side inward facing mirror surface 152 is not the same as the curvature of the image-side inward facing mirror surface 154.

The object-side inward facing mirror surface 172 of the exterior curved reflection boundary 170 is positioned outward in the −X direction relative to the object-side CR planar reflection boundary 130 and the centrally positioned planar reflection boundary 180 such that light 2 incident on the object-side inward facing mirror surface 172 is focused to the focal line $f_2$ on the outward facing mirror surface 182 as light 3. The image-side inward facing mirror surface 174 of the exterior curved reflection boundary 170 is positioned in the −X direction relative to the centrally positioned planar reflection boundary 180 and the object-side CR planar reflection boundary 140 such that light 4 reflected by and diverging from the outward facing mirror surface 182 is reflected and focused by the image-side inward facing mirror surface 174 as light 5. In embodiments, light 4 is focused by the image-side inward facing mirror surface 174 such that light 5 propagates in parallel and is incident on the outward facing mirror surface 142. In embodiments, the curvature of the object-side inward facing mirror surface 172 is the same as the curvature of the image-side inward facing mirror surface 174. In other embodiments, the curvature of the object-side inward facing mirror surface 172 is not the same as the curvature of the image-side inward facing mirror surface 174.

FIG. 1 depicts the curvature of the object-side inward facing mirror surface 152 equal to the curvature of the object-side inward facing mirror surface 172, and the curvature of the image-side inward facing mirror surface 154 equal to the curvature of the image-side inward facing surface 174. However, in embodiments, the curvatures of the inward facing mirror surfaces 152, 154 on the right-hand side (+X direction) of the apex axis 16 are not the same as the curvatures of the inward facing surfaces 172, 174 on the left hand side (−X direction) of the apex axis 16. For example, the curvature of object-side inward facing mirror surface 152 may not be equal to the curvature of the object-side inward facing mirror surface 172. In the alternative, or in addition to, the curvature of the image-side inward facing mirror surface 154 may not be equal to the curvature of the image-side inward facing mirror surface 174.

Still referring to FIG. 1, light 1 from the object 'O' travels in the −Y direction and is incident on the outward facing mirror surfaces 112, 132. Light 1 on the right hand side (+X-direction) of the apex axis 16 of the cloaking assembly 10 is reflected in parallel as light 2 by the outward facing mirror surface 112 to the object-side inward facing mirror surface 152 before being reflected and focused as light 3 to the focal line $f_1$ on the outward facing mirror surface 162. Light 3 is reflected by and diverges from the outward facing mirror surface 162 as light 4 to the image-side inward facing mirror surface 154 before being reflected and focused as light 5. Light 5 propagates in parallel and is incident on the outward facing mirror surface 122. Light 5 incident on the outward facing mirror surface 122 is reflected generally parallel to light 1 in the +Y-direction by the outward facing mirror surface 122 (indicated by arrow '6' in FIG. 1) and forms a portion of the image I corresponding to the portion of the object O positioned to the right (+X-direction) of the apex axis 16. Accordingly, light 1 from the object O on the right hand side of the apex axis 16 has an optical path of: Object O—outward facing mirror surface 112—object-side inward facing mirror surface 152—outward facing mirror surface 162—image-side inward facing mirror surface 154—outward facing mirror surface 122—I.

Light 1 on the left hand side (−X-direction) of the apex axis 16 of the cloaking assembly 10 is reflected in parallel as light 2 by the outward facing mirror surface 132 to the object-side inward facing mirror surface 172 before being reflected and focused as light 3 to the focal line $f_2$ on the outward facing mirror surface 182. Light 3 is reflected by and diverges from the outward facing mirror surface 182 as light 4 to the image-side inward facing mirror surface 174 before being reflected and focused as light 5. Light 5 propagates in parallel and is incident on the outward facing mirror surface 142. Light 5 incident on the outward facing mirror surface 142 is reflected generally parallel to light 1 in the −Y-direction by the outward facing mirror surface 142 as light 6 and forms a portion of the image I corresponding to the portion of the object O positioned to the left (−X-direction) of the apex axis 16. Accordingly, light 1 from the object O on the left hand side of the apex axis 16 has an optical path of: Object O—outward facing mirror surface 132—object-side inward facing mirror surface 172—outward facing mirror surface 182—image-side inward facing mirror surface 174—outward facing mirror surface 142—I.

In combination, i.e., light 1 on the right hand side (+X direction) and left hand side (−X direction) of the apex axis 16 from the object O on the object-side 12 of the cloaking assembly 10 propagates to the image-side 14 via the optical path: Object O—object-side CR planar reflection boundaries 110, 130—object-side inward facing mirror surfaces 152, 172—centrally positioned planar reflection boundaries 160, 180—image-side inward facing mirror surfaces 154, 174—image-side CR planar reflection boundaries 120, 140—Image. That is, light 1 from the object O propagates via the optical path: object O—outward facing mirror surfaces 112, 132 of the object-side CR planar reflection boundaries 110, 130, respectively—object-side inward facing mirror surfaces 152, 172 of the exterior curved reflection boundaries 150, 170, respectively—outward facing mirror surfaces 162, 182 of the centrally positioned planar reflection boundaries 160, 180, respectively—image-side inward facing mirror surfaces 154, 174 of the exterior curved reflection boundaries 150, 170, respectively—outward facing mirror surfaces 122, 142 of the image-side CR planar reflection boundaries 120, 140, respectively—image I.

Figure 2:
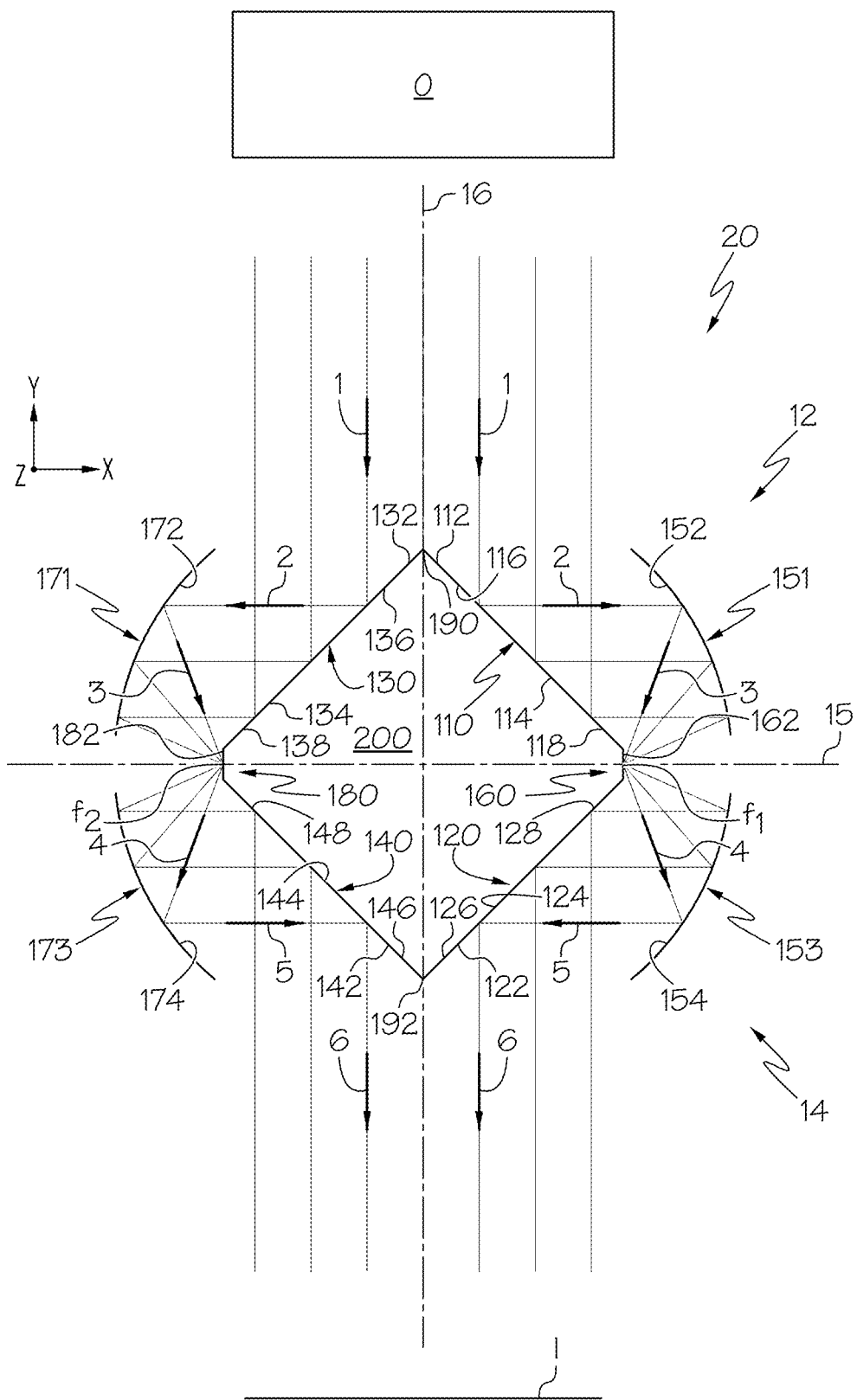
FIG. 2 schematically depicts a top view of a cloaking device according to one or more embodiments disclosed and described herein.

Referring to FIG. 2, an embodiment of a cloaking assembly 20 is depicted similar to the cloaking assembly 10 of FIG. 1, except for the exterior curved reflection boundaries 150, 170. Particularly, the exterior curved reflection boundaries 150, 170 comprise object-side exterior curved reflection boundaries 151, 171, respectively, and image-side exterior curved reflection boundaries 153, 173, respectively. That is, the exterior curved reflection boundaries 150, 170 depicted as a single component in FIG. 1 are formed from two components as depicted in FIG. 2. The object-side exterior curved reflection boundaries 151, 171 include the object-side inward facing mirror surfaces 152, 172, respectively, and the image-side exterior curved reflection boundaries 153, 173 include the image-side inward facing mirror surfaces 154, 174. It should be understood that the exterior curved reflection boundaries 150, 170 constructed from two separate components may provide flexibility in the design and manufacture of the cloaking assembly 10.

Still referring to FIG. 2, light 1 from the object 'O' travels in the −Y direction and is incident on the outward facing mirror surfaces 112, 132. Light 1 on the right hand side (+X-direction) of the apex axis 16 of the cloaking assembly 20 is reflected in parallel as light 2 by the outward facing mirror surface 112 to the object-side inward facing mirror surface 152 on the object-side exterior curved reflection boundary 151 before being reflected and focused as light 3 to the focal line $f_1$ on the outward facing mirror surface 162. Light 3 is reflected by and diverges from the outward facing mirror surface 162 as light 4 to the image-side inward facing mirror surface 154 on the image-side exterior curved reflection boundary 153 before being reflected and focused as light 5. In embodiments, light 4 is focused by the image-side inward facing mirror surface 154 such that light 5 propagates in parallel and is incident on the outward facing mirror surface 122. Light 5 incident on the outward facing mirror surface 122 is reflected generally parallel to light 1 in the −Y-direction by the outward facing mirror surface 122 and forms a portion of the image I corresponding to the portion of the object O positioned to the right (+X-direction) of the apex axis 16. Accordingly, light 1 from the object O on the right hand side of the apex axis 16 has an optical path of: Object O—object-side CR planar reflection boundary 110—object-side exterior curved reflection boundary 151—centrally positioned planar reflection boundary 160—image-side exterior curved reflection boundary 153—image-side CR planar reflection boundary 120—I.

Light 1 on the left hand side (−X-direction) of the apex axis 16 of the cloaking assembly 20 is reflected in parallel as light 2 by the outward facing mirror surface 132 to the object-side inward facing mirror surface 172 on the object-side exterior curved reflection boundary 171 before being reflected and focused as light 3 to the focal line $f_2$ on the outward facing mirror surface 182. Light 3 is reflected by and diverges from the outward facing mirror surface 182 as light 4 to the image-side inward facing mirror surface 174 on the image-side exterior curved reflection boundary 173 before being reflected and focused as light 5. In embodiments, light 4 is focused by the image-side inward facing mirror surface 174 such that light 5 propagates in parallel and is incident on the outward facing mirror surface 142. Light 5 incident on the outward facing mirror surface 142 is reflected generally parallel to light 1 in the −Y-direction by the outward facing mirror surface 142 and forms a portion of the image I corresponding to the portion of the object O positioned to the left (−X-direction) of the apex axis 16. Accordingly, light 1 from the object O on the left hand side of the apex axis 16 has an optical path of: Object O—object-side CR planar reflection boundary 130—object-side exterior curved reflection boundary 171—centrally positioned planar reflection boundary 180—image-side exterior curved reflection boundary 173—image-side CR planar reflection boundary 140—I.

In combination, i.e., light 1 on the right hand side (+X direction) and left hand side (−X direction) of the apex axis 16 from the object O on the object-side 12 of the cloaking assembly 20 propagates to the image-side 14 via the optical path: Object—object-side CR planar reflection boundaries 110, 130—object-side exterior curved reflection boundaries 151, 171—centrally positioned planar reflection boundaries 160, 180—image-side exterior curved reflection boundaries 153, 173—image-side CR planar reflection boundaries 120, 140—Image. That is, light 1 from the object O propagates via the optical path: object O—outward facing mirror surfaces 112, 132 of the object-side CR planar reflection boundaries 110, 130, respectively—object-side inward facing mirror surfaces 152, 172 of the object-side exterior curved reflection boundaries 151, 171, respectively—outward facing mirror surfaces 162, 182 of the centrally positioned planar reflection boundaries 160, 180, respectively—image-side inward facing mirror surfaces 154, 174 of the image-side exterior curved reflection boundaries 153, 173, respectively—outward facing mirror surfaces 122, 142 of the image-side CR planar reflection boundaries 120, 140, respectively—image I.

Figure 3:
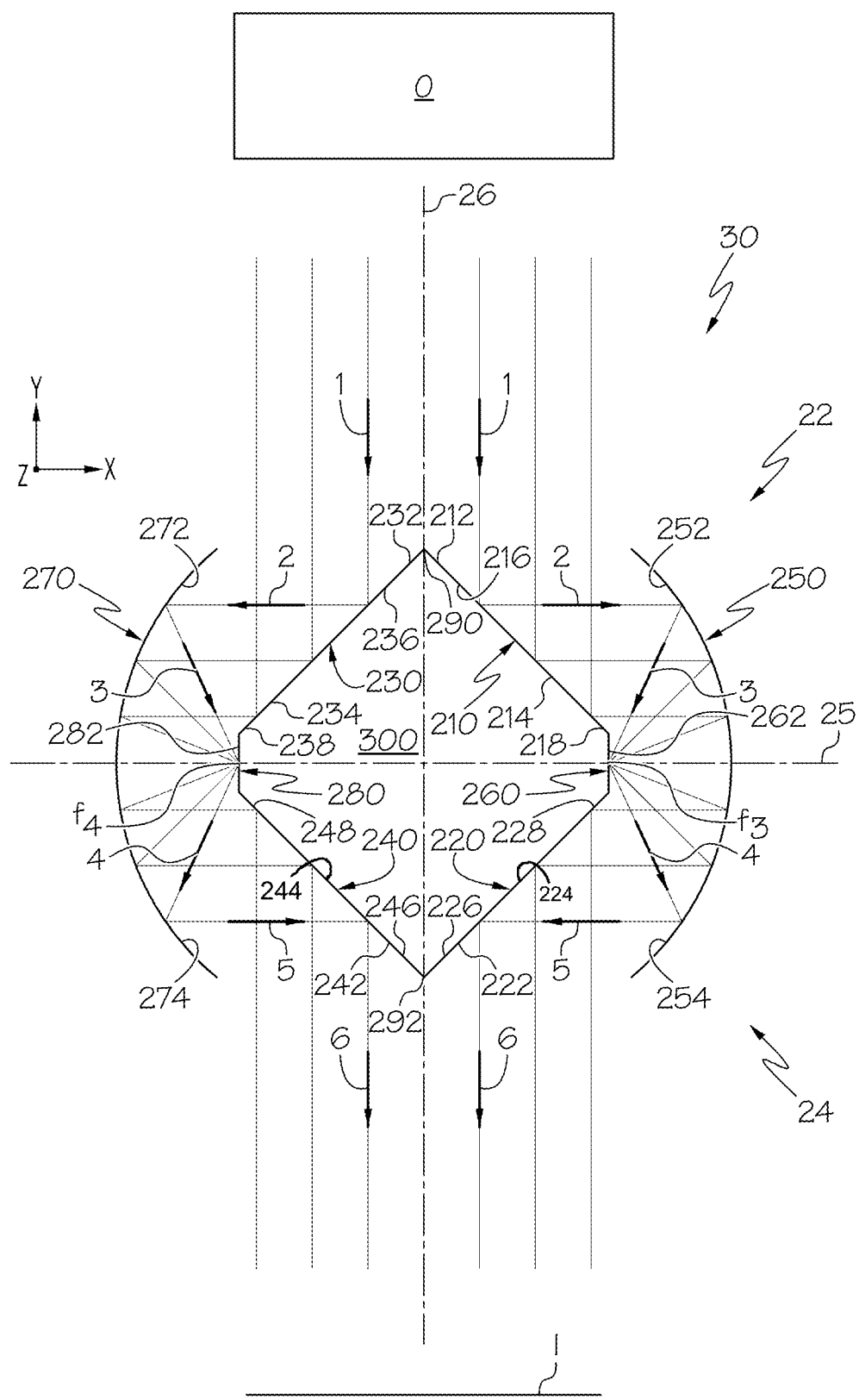
FIG. 3 schematically depicts a top view of a cloaking device according to one or more embodiments disclosed and described herein.

Referring now to FIG. 3, embodiments of a cloaking device with an expanded cloaking region compared to the cloaking assemblies 10, 20 described above, include a cloaking assembly 30 with an object-side 22, an image-side 24 and four CR planar reflection boundaries 210, 220, 230, 240. The object side 22 is positioned above (+Y direction) a bisecting axis 25 and the image-side 24 is positioned below (−Y direction) the bisecting axis 25. That is, the bisecting axis 25 extends between and delineates the object-side 22 and the image-side 24. Each of the four CR planar reflection boundaries 210, 220, 230, 240 has a length along the X-axis, a width along the Y-axis and a height along the Z-axis shown in the figures. That is, the X-axis shown in the figures extends along a length of the four CR planar reflection boundaries 210, 220, 230, 240, the Y-axis shown in the figures extends along a width of the four CR planar reflection boundaries 210, 220, 230, 240, and the Z-axis shown in the figures extends along a height of the four CR planar reflection boundaries 210, 220, 230, 240. The two CR planar reflection boundaries 210, 230 may be positioned on the object-side 22 of the cloaking assembly 30 to face an object 'O' and may be referred to herein as object-side CR planar reflection boundaries 210, 230. The two CR planar reflection boundaries 220, 240 may be positioned on the image-side 24 of the cloaking assembly 30 to provide an image 'I' formed by the cloaking assembly 30 and may be referred to herein as image-side CR planar reflection boundaries 220, 240.

The CR planar reflection boundaries 210, 220, 230, 240 each have an outward facing mirror surface 212, 222, 232, 242 and an inward facing surface 214, 224, 234, 244, respectively. The term "outward" used herein refers to a surface that faces away and/or reflects light away from a cloaking region 300 and the term "inward" used herein refers to a surface that faces towards and/or reflects light towards the cloaking region 300. In embodiments, one or more of the inward facing surfaces 214, 224, 234, 244 may be an opaque surface, a mirror surface or a transparent surface. The outward facing mirror surfaces 212, 222, 232, 242 can be made from omnidirectional photonic crystals or mirrors such that light incident on the outward facing mirror surfaces 212, 222, 232, 242 is reflected there from.

The CR planar reflection boundaries 210, 220, 230, 240 may have an apex end 216, 226, 236, 246 and a side end 218, 228, 238, 248, respectively. The side ends 218, 228, 238, 248 are spaced apart from the apex ends 216, 226, 236, 246, respectively, and the CR planar reflection boundaries 210, 220, 230, 240 extend between apex ends 216, 226, 236, 246 and side ends 218, 228, 238, 248, respectively. In embodiments, the apex ends 216, 236 of the two object-side CR planar reflection boundaries 210, 230, respectively, meet or intersect at an apex 290, and in the alternative or in addition to, the apex ends 226, 246 of the two image-side CR planar reflection boundaries 220, 240, respectively, meet or intersect at an apex 292. In such embodiments, an apex axis 26 bisects the apex 290 and the apex 292, and may be a centerline between a right hand side (+X direction) and a left hand side (−X direction) of the cloaking assembly 30. In other embodiments, the apex ends 216, 236 of the two object-side CR planar reflection boundaries 210, 230, respectively, are spaced apart from each other and the apex ends 226, 246 of the two image-side CR planar reflection boundaries 220, 240, respectively, are spaced apart from each other such that a uncloaked region or gap (not shown) is present between the spaced apart apex ends 216, 236 and spaced apart apex ends 226, 246. In such embodiments, an image of the portion of the object O positioned above (+Y direction) the uncloaked region is not provided on the image side 24 of the cloaking assembly 30.

In embodiments, the two object-side CR planar reflection boundaries 210, 230 and the two image-side CR planar reflection boundaries 220, 240 form the cloaking region 300 that is bound at least partly by the inward facing surfaces 214, 234, 224, 244. The two object-side CR planar reflection boundaries 210, 230 and the two image-side CR planar reflection boundaries 220, 240 have a height 'h' in the Z-direction of the coordinate axes in the figures and light reflected or transmitted within the cloaking region 300 does not pass through the inward facing surfaces 214, 234, 224, 244. Accordingly, an article located within the cloaking region 300 (e.g., a cloaked article) is not visible to an observer viewing the cloaking assembly 30 from the image-side 24 in the +Y direction.

Still referring to FIG. 3, an exterior curved reflection boundaries 250 is spaced apart from the CR planar reflection boundaries 210, 220 and an exterior curved reflection boundary 270 is spaced apart from the CR planar reflection boundaries 230, 240. The exterior curved reflection boundary 250 includes an object-side inward facing mirror surface 252 facing the outward facing mirror surface 212 of the object-side CR planar reflection boundary 210 and an image-side inward facing mirror surface 254 facing the outward facing mirror surface 222 of the image-side CR planar reflection boundary 220. The exterior curved reflection boundary 270 includes an object-side inward facing mirror surface 272 facing the outward facing mirror surface 232 of the object-side CR planar reflection boundary 230 and an image-side inward facing mirror surface 274 facing the outward facing mirror surface 242 of the image-side CR planar reflection boundary 240. In some embodiments, the object-side inward facing mirror surface 252 and the image-side inward facing mirror surface 254 may be a single inward facing mirror surface. That is, a single inward facing mirror surface comprising the object-side inward facing mirror surface 252 and the image-side inward facing mirror surface 254 may extend along an inner surface of the exterior curved reflection boundary 250. In other embodiments, the object-side inward facing mirror surface 252 and the image-side inward facing mirror surface 254 are two separate and distinct inward facing mirror surfaces. Similarly, the object-side inward facing mirror surface 272 and the image-side inward facing mirror surface 274 may be a single inward facing mirror surface. In the alternative, the object-side inward facing mirror surface 272 and the image-side inward facing mirror surface 274 may be two separate and distinct inward facing mirror surfaces.

Positioned between the object-side CR planar reflection boundary 210 and the image-side CR planar reflection boundary 220 is a centrally positioned planar reflection boundary 260 with an outward facing mirror surface 262. The outward facing mirror surface 262 faces the object-side inward facing mirror surface 252 and the image-side inward facing mirror surface 254 of the exterior curved reflection boundary 250. In embodiments, the object-side CR planar reflection boundary 210 is oriented 45° relative to the apex axis 26, the centrally positioned planar reflection boundary 260 is oriented 45° relative to the object-side CR planar reflection boundary 210, and the image-side CR planar reflection boundary 220 is oriented 45° relative to the centrally positioned planar reflection boundary 260 and the apex axis 26. In such embodiments, the image-side CR planar reflection boundary 220 is oriented 90° relative to the object-side CR planar reflection boundary 210 and the centrally positioned planar reflection boundary 260 is oriented parallel to the apex axis 26. In other embodiments, the object-side CR planar reflection boundary 210 is not oriented 45° relative to the apex axis 26, the centrally positioned planar reflection boundary 260 is not oriented 45° relative to the object-side CR planar reflection boundary 210, and the image-side CR planar reflection boundary 220 is not oriented 45° relative to the centrally positioned planar reflection boundary 260 and the apex axis 26. For example, the object-side CR planar reflection boundary 210 may be oriented 30° relative to the apex axis 26, the centrally positioned planar reflection boundary 260 is oriented 30° relative to the object-side CR planar reflection boundary 210, and the image-side CR planar reflection boundary 220 is oriented 30° relative to the centrally positioned planar reflection boundary 260 and the apex axis 26. In such embodiments, the image-side CR planar reflection boundary 220 is oriented 120° relative to the object-side CR planar reflection boundary 210 and the centrally positioned planar reflection boundary 260 is oriented parallel to the apex axis 26.

Positioned between the object-side CR planar reflection boundary 230 and the image-side CR planar reflection boundary 240 is a centrally positioned planar reflection boundary 280 with an outward facing mirror surface 282. The outward facing mirror surface 282 faces the object-side inward facing mirror surface 272 and the image-side inward facing mirror surface 274 of the exterior curved reflection boundary 270. In embodiments, the object-side CR planar reflection boundary 230 is oriented 45° relative to the apex axis 26, the centrally positioned planar reflection boundary 280 is oriented 45° relative to the object-side CR planar reflection boundary 230, and the image-side CR planar reflection boundary 240 is oriented 45° relative to the centrally positioned planar reflection boundary 280 and the apex axis 26. In such embodiments, the image-side CR planar reflection boundary 240 is oriented 90° relative to the object-side CR planar reflection boundary 230 and the centrally positioned planar reflection boundary 280 is oriented parallel to the apex axis 26. In other embodiments, the object-side CR planar reflection boundary 230 is not oriented 45° relative to the apex axis 26, the centrally positioned planar reflection boundary 280 is not oriented 45° relative to the object-side CR planar reflection boundary 230, and the image-side CR planar reflection boundary 240 is not oriented 45° relative to the centrally positioned planar reflection boundary 280 and the apex axis 26. For example, the object-side CR planar reflection boundary 230 may be oriented 30° relative to the apex axis 26, the centrally positioned planar reflection boundary 280 is oriented 30° relative to the object-side CR planar reflection boundary 230, and the image-side CR planar reflection boundary 240 is oriented 30° relative to the centrally positioned planar reflection boundary 280 and the apex axis 26. In such embodiments, the image-side CR planar reflection boundary 240 is oriented 120° relative to the object-side CR planar reflection boundary 230 and the centrally positioned planar reflection boundary 280 is oriented parallel to the apex axis 26.

In embodiments the centrally positioned planar reflection boundaries 260, 280 are positioned on a bisecting axis 25 that extends between and delineates the object-side 22 and the image-side 24. In such embodiments, the outward facing mirror surface 262 may be equally positioned between and spaced apart from the object-side inward facing mirror surface 252 and the image-side inward facing mirror surface 254, and the outward facing mirror surface 282 may be equally positioned between and spaced apart from the object-side inward facing mirror surface 272 and the image-side inward facing mirror surface 274. The centrally positioned planar reflection boundaries 260, 280 may be positioned adjacent to the side ends 218, 228 and side ends 238, 248, respectively. Also, the outward facing mirror surfaces 262, 282 of the centrally positioned planar reflection boundaries 260, 280, respectively, may be oriented generally parallel to the apex axis 26 that bisects the apex 290 and the apex 292. In the alternative or in addition to, the outward facing mirror surfaces 262, 282 of the centrally positioned planar reflection boundaries 260, 280 may be oriented generally parallel to light 1.

The exterior curved reflection boundary 250 is positioned relative to the object-side CR planar reflection boundary 210 such that light from the object O (shown as arrow '1' in FIG. 3) incident on the cloaking assembly 30 on the right hand side (+X direction) of the apex axis 26 is reflected by the outward facing mirror surface 212 onto the object-side inward facing mirror surface 252 (shown as arrow '2' in FIG. 3). In embodiments, light 2 is reflected from the outward facing mirror surface 212 in parallel onto the object-side inward facing mirror surface 252. The centrally positioned planar reflection boundary 260 is positioned relative to the object-side inward facing mirror surface 252 such that light 2 from the outward facing mirror surface 212 is reflected and focused by the object-side inward facing mirror surface 252 onto the outward facing mirror surface 262 (shown as arrow '3' in FIG. 3). In embodiments, light 3 is focused to a focal line $f_3$ and the outward facing mirror surface 262 is positioned at the focal line $f_3$. Light 3 incident on the object-side inward facing mirror surface 252 along the height h (Z-direction) of the exterior curved reflection boundary 250 may be generally focused to a line intersecting the focal line $f_3$ and extending in the Z-direction.

The exterior curved reflection boundary 250 is positioned relative to the centrally positioned planar reflection boundary 260 such that light 3 reflected by and diverging from the outward facing mirror surface 262 is incident on the image-side inward facing mirror surface 254 (shown as arrow '4' in FIG. 3). The image-side CR planar reflection boundary 220 is positioned relative to the exterior curved reflection boundary 250 such that light 4 reflected and focused by the image-side inward facing mirror surface 254 is incident on the outward facing mirror surface 222 (shown as arrow '5' in FIG. 3). In embodiments, light 5 is reflected and focused by the image-side inward facing mirror surface 254 in parallel onto the outward facing mirror surface 222. The image-side CR planar reflection boundary 220 is positioned relative to the image-side inward facing mirror surface 254 such that light 5 is reflected in parallel and forms a portion of the Image I on the right hand side (+X direction) of the apex axis 26.

The exterior curved reflection boundary 270 is positioned relative to the object-side CR planar reflection boundary 230 such that light 1 from the object O incident on the cloaking assembly 30 on the left hand side (−X direction) of the apex axis 26 is reflected by the outward facing mirror surface 232 as light 2 onto the object-side inward facing mirror surface 272. In embodiments, light 2 is reflected by the outward facing mirror surface 232 in parallel onto the object-side inward facing mirror surface 272. The centrally positioned planar reflection boundary 280 is positioned relative to the object-side inward facing mirror surface 272 such that light 2 from the outward facing mirror surface 232 is reflected and focused by the object-side inward facing mirror surface 272 as light 3 onto the outward facing mirror surface 282. In embodiments, light 3 is focused to a focal line $f_4$ and the outward facing mirror surface 282 is positioned at the focal line $f_4$. Light 3 incident on the object-side inward facing mirror surface 272 along the height h (Z-direction) of the exterior curved reflection boundary 270 may be generally focused to a line intersecting the focal line $f_4$ and extending in the Z-direction.

The exterior curved reflection boundary 270 is positioned relative to the centrally positioned planar reflection boundary 280 such that light 3 reflected by and diverging from the outward facing mirror surface 282 (light 4) is incident on the image-side inward facing mirror surface 274. The image-side CR planar reflection boundary 240 is positioned relative to the exterior curved reflection boundary 270 such that light 4 reflected and focused by the image-side inward facing mirror surface 274 (light 5) is incident on the outward facing mirror surface 242. In embodiments, light 5 is reflected and focused by the image-side inward facing mirror surface 274 in parallel onto the outward facing mirror surface 242. The image-side CR planar reflection boundary 240 is positioned relative to the image-side inward facing mirror surface 274 such that light 5 is reflected in parallel as light 6 and forms a portion of the Image I on the left hand side (−X direction) of the apex axis 26.

Still referring to FIG. 3, the object-side inward facing mirror surface 252 of the exterior curved reflection boundary 250 is positioned outward in the +X direction relative to the object-side CR planar reflection boundary 210 and the centrally positioned planar reflection boundary 260 such that light 2 incident on the object-side inward facing mirror surface 252 is focused to the focal line $f_3$ on the outward facing mirror surface 262 as light 3. The image-side inward facing mirror surface 254 of the exterior curved reflection boundary 250 is positioned in the +X direction relative to the centrally positioned planar reflection boundary 260 and the image-side CR planar reflection boundary 220 such that light 4 reflected by and diverging from the outward facing mirror surface 262 is reflected and focused by the image-side inward facing mirror surface 254 as light 5. In embodiments, light 4 is focused by the image-side inward facing mirror surface 254 such that light 5 propagates in parallel and is incident on the outward facing mirror surface 222. In embodiments, the curvature of the object-side inward facing mirror surface 252 is the same as the curvature of the image-side inward facing mirror surface 254. In other embodiments, the curvature of the object-side inward facing mirror surface 252 is not the same as the curvature of the image-side inward facing mirror surface 254.

The object-side inward facing mirror surface 272 of the exterior curved reflection boundary 270 is positioned outward in the −X direction relative to the object-side CR planar reflection boundary 230 and the centrally positioned planar reflection boundary 280 such that light 2 incident on the object-side inward facing mirror surface 272 is focused to the focal line $f_4$ on the outward facing mirror surface 282 as light 3. The image-side inward facing mirror surface 274 of the exterior curved reflection boundary 270 is positioned in the −X direction relative to the centrally positioned planar reflection boundary 280 and the image-side CR planar reflection boundary 240 such that light 4 reflected by and diverging from the outward facing mirror surface 282 is reflected and focused by the image-side inward facing mirror surface 274 as light 5. In embodiments, light 4 is focused by the image-side inward facing mirror surface 274 such that light 5 propagates in parallel and is incident on the outward facing mirror surface 242. In embodiments, the curvature of the object-side inward facing mirror surface 272 is the same as the curvature of the image-side inward facing mirror surface 274. In other embodiments, the curvature of the object-side inward facing mirror surface 272 is not the same as the curvature of the image-side inward facing mirror surface 274.

Still referring to FIG. 3, light 1 from the object 'O' travels in the −Y direction and is incident on the outward facing mirror surfaces 212, 232. Light 1 on the right hand side (+X-direction) of the apex axis 26 of the cloaking assembly 30 is reflected in parallel as light 2 by the outward facing mirror surface 212 to the object-side inward facing mirror surface 252 before being reflected and focused as light 3 to the focal line $f_3$ on the outward facing mirror surface 262. Light 3 is reflected by and diverges from the outward facing mirror surface 262 as light 4 to the image-side inward facing mirror surface 254 before being reflected and focused as light 5. Light 5 propagates in parallel and is incident on the outward facing mirror surface 222. Light 5 incident on the outward facing mirror surface 222 is reflected generally parallel to light 1 in the −Y-direction by the outward facing mirror surface 222 (indicated by arrow '6' in FIG. 3) and forms a portion of the image I corresponding to the portion of the object O positioned to the right (+X-direction) of the apex axis 26. Accordingly, light 1 from the object O on the right hand side of the apex axis 26 has an optical path of: Object O—outward facing mirror surface 212—object-side inward facing mirror surface 252—outward facing mirror surface 262—image-side inward facing mirror surface 254—outward facing mirror surface 222—I.

Light 1 on the left hand side (−X-direction) of the apex axis 26 of the cloaking assembly 30 is reflected in parallel as light 2 by the outward facing mirror surface 232 to the object-side inward facing mirror surface 272 before being reflected and focused as light 3 to the focal line $f_4$ on the outward facing mirror surface 282. Light 3 is reflected by and diverges from the outward facing mirror surface 282 as light 4 to the image-side inward facing mirror surface 274 before being reflected and focused as light 5. Light 5 propagates in parallel and is incident on the outward facing mirror surface 242. Light 5 incident on the outward facing mirror surface 242 is reflected generally parallel to light 1 in the −Y-direction by the outward facing mirror surface 242 as light 6 and forms a portion of the image I corresponding to the portion of the object O positioned to the left (−X-direction) of the apex axis 26. Accordingly, light 1 from the object O on the left hand side of the apex axis 26 has an optical path of: Object O—outward facing mirror surface 232—object-side inward facing mirror surface 272—outward facing mirror surface 282—image-side inward facing mirror surface 274—outward facing mirror surface 242—I.

In combination, i.e., light 1 on the right hand side (+X direction) and left hand side (−X direction) of the apex axis 26 from the object O on the object-side 22 of the cloaking assembly 30 propagates to the image-side 24 via the optical path: Object O—object-side CR planar reflection boundaries 210, 230—object-side inward facing mirror surfaces 252, 272—centrally positioned planar reflection boundaries 260, 280—image-side inward facing mirror surfaces 254, 274—image-side CR planar reflection boundaries 220, 240—Image. That is, light 1 from the object O propagates via the optical path: object O—outward facing mirror surfaces 212, 232 of the object-side CR planar reflection boundaries 210, 230, respectively—object-side inward facing mirror surfaces 252, 272 of the exterior curved reflection boundaries 250, 270, respectively—outward facing mirror surfaces 262, 282 of the centrally positioned planar reflection boundaries 260, 280, respectively—image-side inward facing mirror surfaces 254, 274 of the exterior curved reflection boundaries 250, 270, respectively—outward facing mirror surfaces 222, 242 of the image-side CR planar reflection boundaries 220, 240, respectively—image I.

Figure 4:
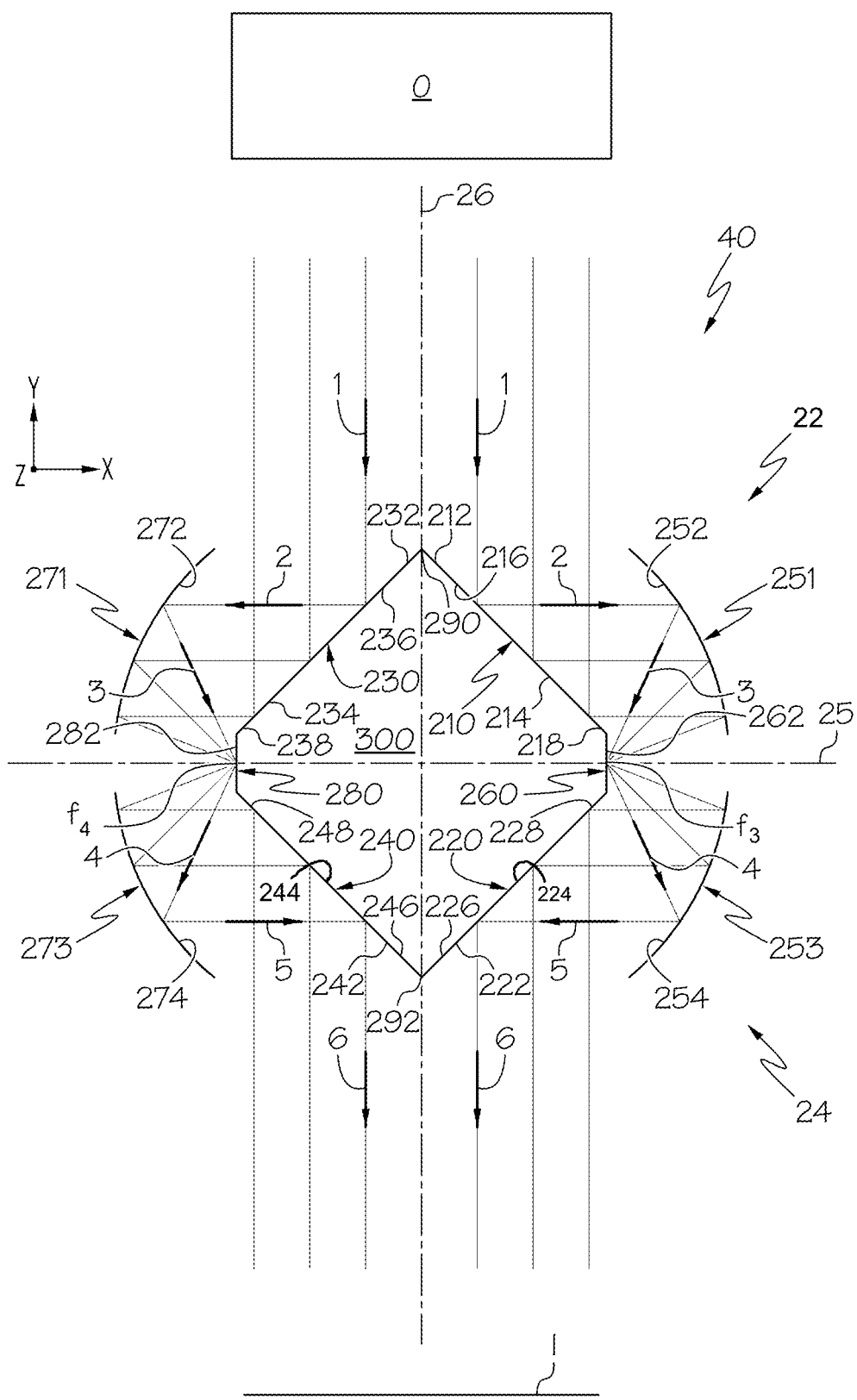
FIG. 4 schematically depicts a top view of a cloaking device according to one or more embodiments disclosed and described herein.

Referring to FIG. 4, an embodiment of a cloaking assembly 40 is depicted similar to the cloaking assembly 30 of FIG. 3, except for the exterior curved reflection boundaries 250, 270. Particularly, the exterior curved reflection boundaries 250, 270 comprise object-side exterior curved reflection boundaries 251, 271, respectively, and image-side exterior curved reflection boundaries 253, 273, respectively. That is, the exterior curved reflection boundaries 250, 270 depicted as a single component in FIG. 3 is formed from two components as depicted in FIG. 4. The object-side exterior curved reflection boundaries 251, 271 include the object-side inward facing mirror surfaces 252, 272, respectively, and the image-side exterior curved reflection boundaries 253, 273 include the image-side inward facing mirror surfaces 254, 274.

Still referring to FIG. 4, light 1 from the object 'O' travels in the −Y direction and is incident on the outward facing mirror surfaces 212, 232. Light 1 on the right hand side (+X-direction) of the apex axis 26 of the cloaking assembly 40 is reflected in parallel as light 2 by the outward facing mirror surface 212 to the object-side inward facing mirror surface 252 on the object-side exterior curved reflection boundary 251 before being reflected and focused as light 3 to the focal line $f_3$ on the outward facing mirror surface 262. Light 3 is reflected by and diverges from the outward facing mirror surface 262 as light 4 to the image-side inward facing mirror surface 254 on the image-side exterior curved reflection boundary 253 before being reflected and focused as light 5. In embodiments, light 4 is focused by the image-side inward facing mirror surface 254 such that light 5 propagates in parallel and is incident on the outward facing mirror surface 222. Light 5 incident on the outward facing mirror surface 222 is reflected generally parallel to light 1 in the −Y-direction by the outward facing mirror surface 222 and forms a portion of the image I corresponding to the portion of the object O positioned to the right (+X-direction) of the apex axis 26. Accordingly, light 1 from the object O on the right hand side of the apex axis 26 has an optical path of: Object O—object-side CR planar reflection boundary 210—object-side exterior curved reflection boundary 251—centrally positioned planar reflection boundary 260—image-side exterior curved reflection boundary 253—image-side CR planar reflection boundary 220—I.

Light 1 on the left hand side (−X-direction) of the apex axis 26 of the cloaking assembly 40 is reflected in parallel as light 2 by the outward facing mirror surface 232 to the object-side inward facing mirror surface 272 on the object-side curved reflection boundary 271 before being reflected and focused as light 3 to the focal line $f_4$ on the outward facing mirror surface 282. Light 3 is reflected by and diverges from the outward facing mirror surface 282 as light 4 to the image-side inward facing mirror surface 274 on the image-side exterior curved reflection boundary 273 before being reflected and focused as light 5. In embodiments, light 4 is focused by the image-side inward facing mirror surface 274 such that light 5 propagates in parallel and is incident on the outward facing mirror surface 242. Light 5 incident on the outward facing mirror surface 242 is reflected generally parallel to light 1 in the −Y-direction by the outward facing mirror surface 242 and forms a portion of the image I corresponding to the portion of the object O positioned to the left (−X-direction) of the apex axis 26. Accordingly, light 1 from the object O on the left hand side of the apex axis 26 has an optical path of: Object O—object-side CR planar reflection boundary 230—object-side curved reflection boundary 271—centrally positioned planar reflection boundary 280—image-side exterior curved reflection boundary 273—image-side CR planar reflection boundary 240—I.

In combination, i.e., light 1 on the right hand side (+X direction) and left hand side (−X direction) of the apex axis 26 from the object O on the object-side 22 of the cloaking assembly 40 propagates to the image-side 24 via the optical path: Object O—object-side CR planar reflection boundaries 210, 230—object-side exterior curved reflection boundaries 251, 271—centrally positioned planar reflection boundaries 260, 280—image-side exterior curved reflection boundaries 253, 273—image-side CR planar reflection boundaries 220, 240—Image. That is, light 1 from the object O propagates via the optical path: object O—outward facing mirror surfaces 212, 232 of the object-side CR planar reflection boundaries 210, 230, respectively—object-side inward facing mirror surfaces 252, 272 of the object-side exterior curved reflection boundaries 251, 271, respectively—outward facing mirror surfaces 262, 282 of the centrally positioned planar reflection boundaries 260, 280, respectively—image-side inward facing mirror surfaces 254, 274 of the image-side exterior curved reflection boundaries 253, 273, respectively—outward facing mirror surfaces 222, 242 of the image-side CR planar reflection boundaries 220, 240, respectively—image I.

Figure 5:
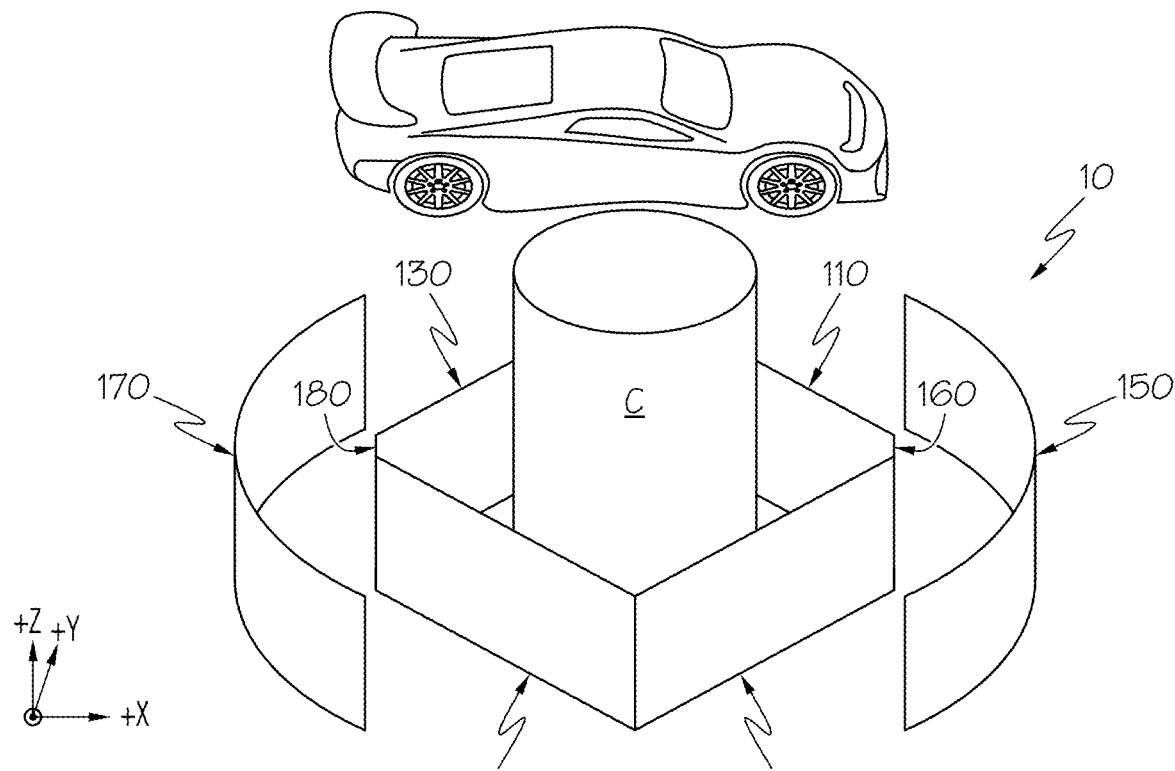
FIG. 5 schematically depicts a top perspective view of the cloaking device of FIG. 1 with a first object on one side of the cloaking device and a second object within the cloaking region of the cloaking device according to one or more embodiments disclosed and described herein.
Figure 6:
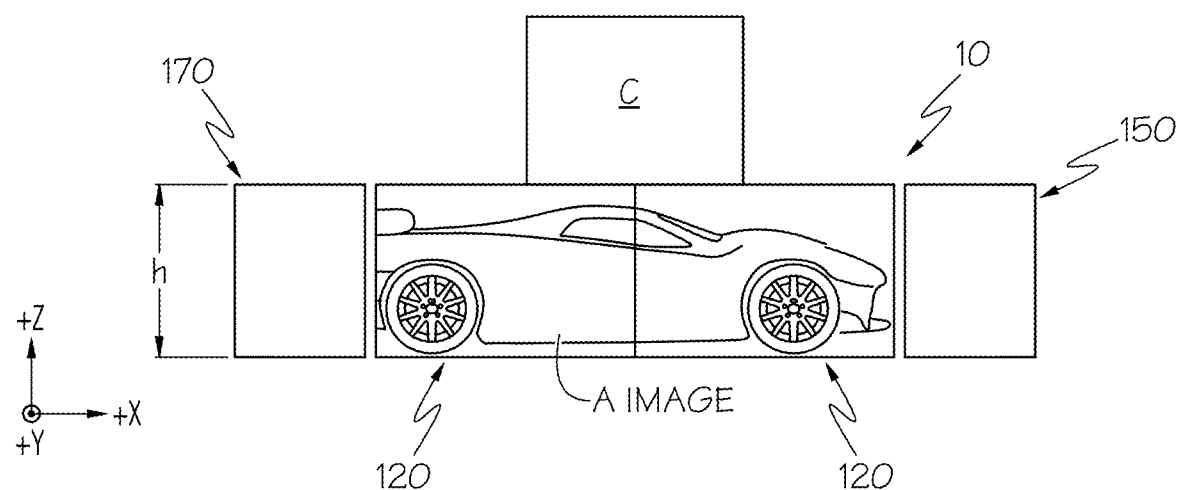
FIG. 6 schematically depicts a side view of the cloaking device of FIG. 1 with the first object on one side of the cloaking device and the second object within the cloaking region of the cloaking device.

Referring now to FIGS. 1 and 5-6, a top perspective view and a side view of cloaking devices according to embodiments as discussed with respect to FIG. 1 is shown in FIGS. 5 and 6, respectively. Specifically, FIG. 5 is a top perspective view of an article in the form of a column 'C' within the cloaking region of the cloaking assembly 10 and an automobile 'A' located behind the column C on the object-side 12 of the cloaking assembly 10 in the +Y direction. The column C has a height dimension in the Z direction (increasing height in the +Z direction) greater than the height h of the cloaking device. FIG. 6 is a side view from the +Y direction of the cloaking assembly 10 shown in FIG. 1 and shows the portion of the column C that is within the cloaking region is not visible and the automobile A located behind the column C in the +Y direction is visible to an observer viewing the cloaking assembly 10 in the +Y direction. Accordingly, the column C positioned within the cloaking region is not visible to an observer viewing the image-side 14 of the cloaking assembly 10 and an image of the entire automobile A is visible to the observer viewing the image-side 14. Although column C in FIGS. 5 and 6 is separate from the CR planar reflection boundaries 110, 120, 130, 140, i.e., column C is a separate object from the cloaking assembly 10, it should be appreciated that column C may be structurally part of cloaking assembly 10 and have an outer surface that provides or is equivalent to the CR planar reflection boundaries with outward facing mirror surfaces.

Figure 7:
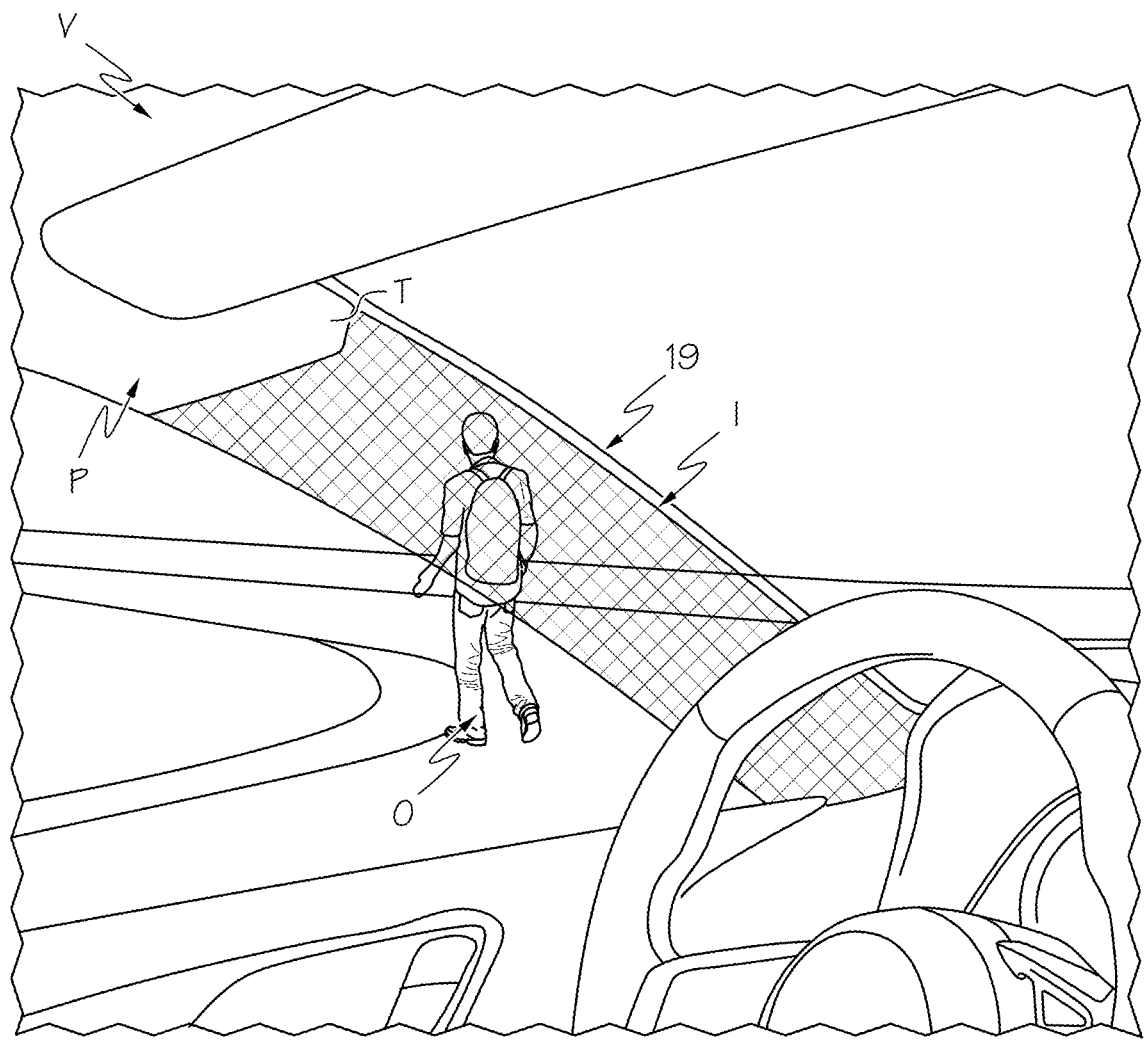
FIG. 7 schematically depicts a cloaking device cloaking a vehicle A-pillar of a vehicle according to one or more embodiments described and illustrated herein.

Referring to FIG. 7, embodiments of an A-pillar of a vehicle being cloaked by a cloaking device are shown. Particularly, FIG. 7 shows a cloaking device 19 cloaking a portion of an A-pillar P of a vehicle V. A portion of the A-pillar P is positioned within a cloaking region (not shown) of the cloaking device 19 and a portion of the A-pillar P extends beyond the cloaking device and is covered with trim T. Illustrated outside of the vehicle V on the object-side of the cloaking device 19 is a target object 'O' in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaking region of the cloaking device 19 and forms an image I of the pedestrian O in the interior of the vehicle on the image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaking region of the cloaking device 19. In embodiments, the A-pillar P itself serves as the CR, i.e. the A-pillar P has an outer surface with one or more outer facing mirror surfaces that assist in redirecting light from the pedestrian around the A-pillar P. It should be appreciated that cloaking of the A-pillar P with the cloaking device 19 and bypassing the blind spot produced by the A-pillar P is performed without the use of metamaterials, video images, cameras, sophisticated electronics, etc.

EXAMPLES

Figure 8A:
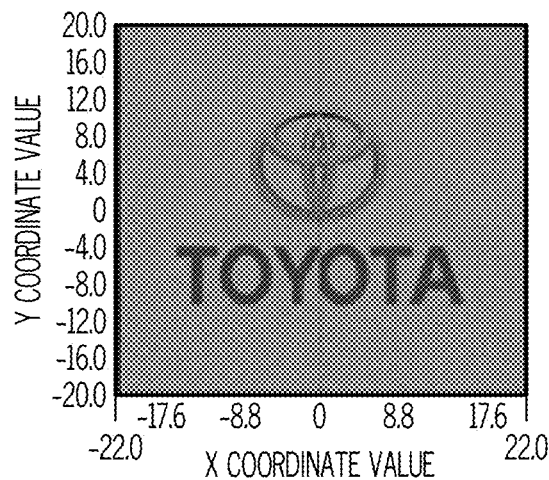
FIG. 8A depicts a computer simulated cloaking image for a cloaking device according to the embodiments of FIG. 1 with a 0° misalignment between an apex axis and a viewing angle the cloaking device.
Figure 8B:
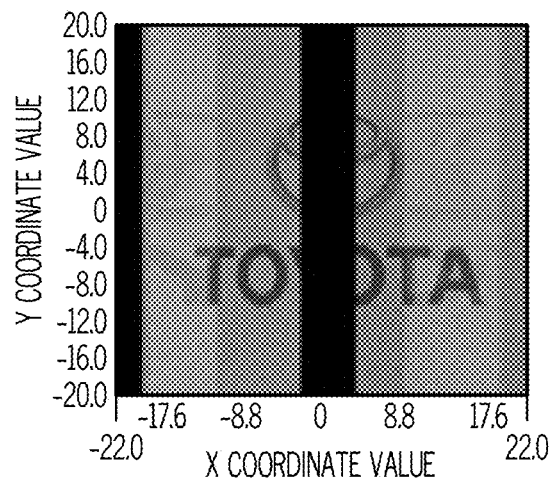
FIG. 8B depicts a computer simulated cloaking image for a cloaking device according to the embodiments of FIG. 1 with a 1° misalignment between an apex axis and a viewing angle the cloaking device.
Figure 8C:
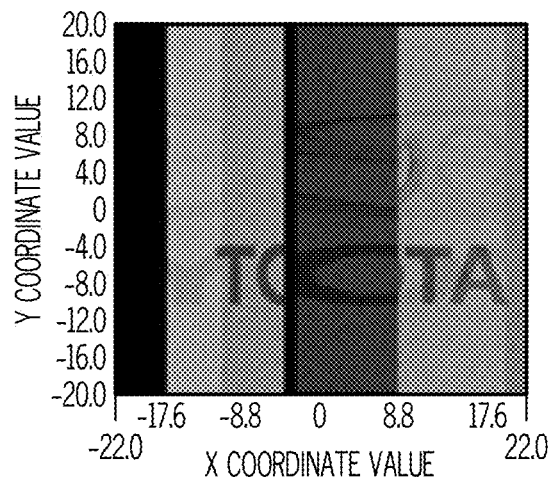
FIG. 8C depicts a computer simulated cloaking image for a cloaking device according to the embodiments of FIG. 1 with a 2° misalignment between an apex axis and a viewing angle the cloaking device.
Figure 8D:
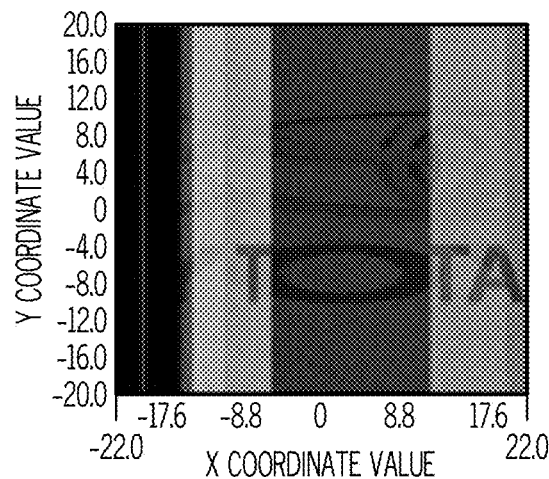
FIG. 8D depicts a computer simulated cloaking image for a cloaking device according to the embodiments of FIG. 1 with a 3° misalignment between an apex axis and a viewing angle the cloaking device.

Referring now to FIGS. 8A-8D, images of an object in the form of an emblem positioned on the object-side 12 of the cloaking assembly 10 and as viewed from the image-side 14 simulated using a commercial software program (Zemax OpticStudio) are depicted. The inward facing mirror surfaces 152, 154, 172, 174 were parabolic mirror surfaces obeying the relationship $y(x)=x^{2}/52$ and the outward facing mirror surfaces 162, 182 had a length (Y-direction) of 4.0 mm. The corresponding focal length for the inward facing mirror surfaces 152, 154, 172, 174 was 13.0 mm. The aspect ratios for the entire device area and the hidden region were 0.71 and 0.9, respectively, with a cloaking ratio (i.e., hidden area/total device area) of about 37%. FIG. 8A depicts an image of the object with no misalignment (0° between the apex axis 16 and a viewing angle of the cloaking assembly 10 from the +Y direction, i.e., an individual viewing the image I in the +Y direction along the apex axis 16. That is, as used herein, the term misalignment refers to an angle defined by the apex axis of a cloaking assembly and a line of sight of an observer viewing the cloaking assembly from the image-side as depicted by the +Y direction in the figures (also referred to herein as a "viewing angle"). FIG. 8B depicts an image of the object with a 1° misalignment between the apex axis 16 and a viewing angle of the cloaking assembly 10. FIG. 8C depicts an image of the object with a 2° misalignment between the apex axis 16 and a viewing angle of the cloaking assembly 10. FIG. 8D depicts an image of the object with a 3° misalignment between the apex axis 16 and a viewing angle of the cloaking assembly 10. As shown by the images in FIGS. 8A-8D, an image of an object on the object-side 12 of the cloaking assembly 10 can be seen clearly with up to 2° misalignment and is still visible with up to 3° of misalignment.

Figure 9A:
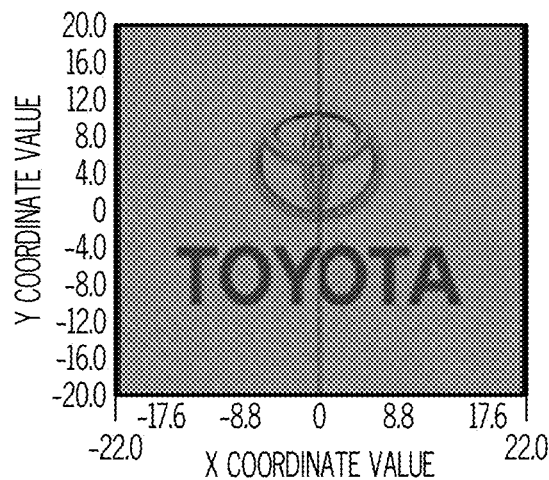
FIG. 9A depicts a computer simulated cloaking image for a cloaking device according to the embodiments of FIG. 3 with a 0° misalignment between an apex axis and a viewing angle the cloaking device.
Figure 9B:
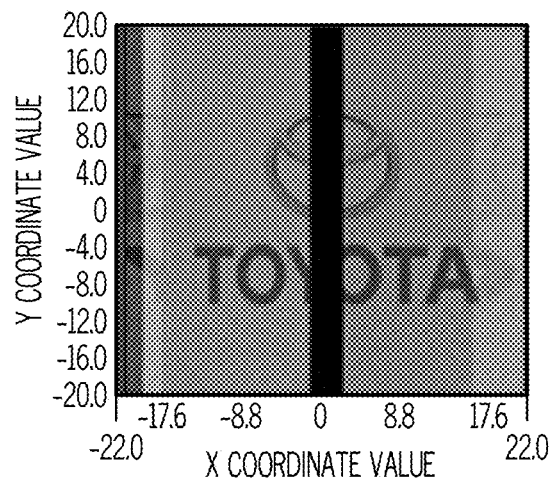
FIG. 9B depicts a computer simulated cloaking image for a cloaking device according to the embodiments of FIG. 3 with a 1° misalignment between an apex axis and a viewing angle the cloaking device.
Figure 9C:
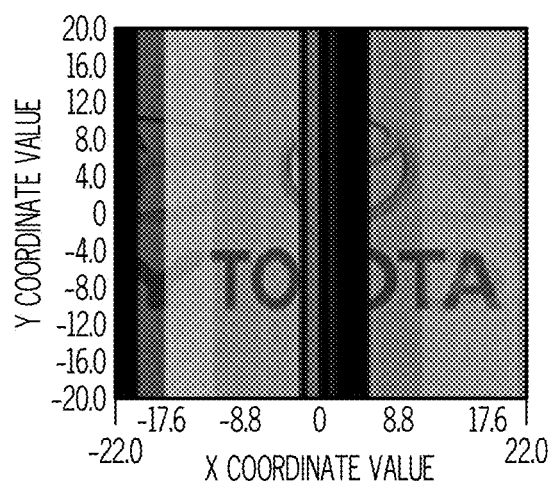
FIG. 9C depicts a computer simulated cloaking image for a cloaking device according to the embodiments of FIG. 3 with a 2° misalignment between an apex axis and a viewing angle the cloaking device.
Figure 9D:
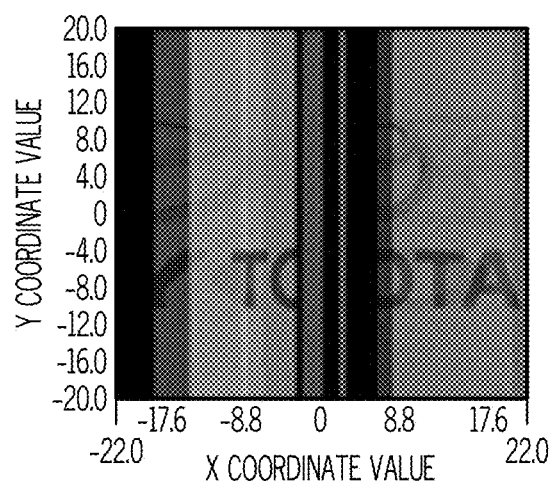
FIG. 9D depicts a computer simulated cloaking image for a cloaking device according to the embodiments of FIG. 3 with a 3° misalignment between an apex axis and a viewing angle the cloaking device.

Referring now to FIGS. 9A-9D, simulated images (Zemax OpticStudio) of an object in the form of an emblem positioned on the object-side 22 and as viewed from the image-side 24 of the cloaking assembly 30 are depicted. The inward facing mirror surfaces 252, 254, 272, 274 were parabolic mirror surfaces obeying the expression $y(x)=x^{2}/56$ and the outward facing mirror surfaces 262, 282 had a length (Y-direction) of 10 mm. The corresponding focal length for the inward facing mirror surfaces 252, 254, 272, 274 was 14.0 mm. FIG. 9A depicts an image of the object with no misalignment (0° between the apex axis 26 and a viewing angle of the cloaking assembly 30. FIG. 9B depicts an image of the object with a 1° misalignment between the apex axis 26 and a viewing angle of the cloaking assembly 30. FIG. 9C depicts an image of the object with a 2° misalignment between the apex axis 26 and a viewing angle of the cloaking assembly 30. FIG. 9D depicts an image of the object with a 3° misalignment between the apex axis 26 and a viewing angle of the cloaking assembly 30. As shown by the images in FIGS. 9A-9D, an image of an object on the object-side 22 of the cloaking assembly 30 can be seen clearly with up to 2° of misalignment and is still visible with up to 3° of misalignment.

The cloaking devices described herein may be used to cloak vehicle articles when viewed from within the vehicle, such as a vehicle A-pillar, B-pillar, C-pillar, D-pillar, etc., and bypass a blind spot caused by the vehicle article. The terms "object," "article," and "item" may interchangeably refer to a visual object or image (2D or 3D) that reflects light or transmits light and the term "light from" may refer to "light reflected from" or "light transmitted from." The terms "generally," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Although the embodiments disclosed and described in the figures depict a cloaking assembly with a CR bounded by four CR planar reflection boundaries, cloaking assemblies with a CR bounded by two CR planar reflection boundaries are provided. For example and without limitation, a cloaking region may be bounded between an object-side CR planar reflection boundary and an image-side CR planar reflection boundary. Also, the combination of CR planar reflection boundaries and relative placement of the at least one exterior curved reflection boundary enhances the misalignment tolerance such that an individual can see an object through a cloaking region with up to 3° of misalignment between an apex axis of the cloaking assembly and viewing of the cloaking assembly.

Directional terms as used herein—for example up, down, right, left, front, back, top, bottom, vertical, horizontal—are made only with reference to the figures as drawn and are not intended to imply absolute orientation unless otherwise expressly stated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
an object-side, an image-side and an apex axis extending from the object-side to the image-side;
an object-side cloaking region (CR) planar reflection boundary having an outward facing mirror surface and an inward facing surface and an image-side CR planar reflection boundary having an outward facing mirror surface and an inward facing surface;
a cloaking region bounded by the inward facing surfaces of the object-side CR planar reflection boundary and the image-side CR planar reflection boundary; at least one exterior curved reflection boundary comprising an inward facing mirror surface spaced apart from the object-side CR planar reflection boundary and the image-side CR planar reflection boundary; and
a centrally positioned planar reflection boundary comprising an outward facing mirror surface positioned between and facing the inward facing mirror surface of the at least one exterior curved reflection boundary;
wherein light from an object positioned on the object-side of the cloaking device and obscured by the cloaking region is reflected by the object-side CR planar reflection boundary, the at least one exterior curved reflection boundary, the centrally positioned planar reflection boundary and the image-side CR planar reflection boundary around the cloaking region to form an image of the object on the image-side of the cloaking device such that the light from the object appears to pass through the cloaking region.

2. The cloaking device of claim 1, wherein the at least one exterior curved reflection boundary comprises an object-side inward facing parabolic mirror surface positioned proximate to and facing the outward facing mirror surface of the object-side CR planar reflection boundary and an image-side inward facing parabolic mirror surface positioned proximate to and facing the outward facing mirror surface of the image-side CR planar reflection boundary.

3. The cloaking device of claim 2, wherein the object-side CR planar reflection boundary is oriented to reflect incident light from the object positioned on the object side of the cloaking device in parallel onto the object-side inward facing parabolic mirror surface, the object-side inward facing parabolic mirror surface is oriented to reflect and focus light from the object-side CR planar reflection boundary onto the outward facing mirror surface of the centrally positioned planar reflection boundary, the outward facing mirror surface of the centrally positioned planar reflection boundary is oriented to reflect light from the object-side inward facing parabolic mirror surface onto the image-side inward facing parabolic mirror surface, the image-side inward facing parabolic mirror surface is oriented to reflect and focus light from the outward facing mirror surface of the centrally positioned planar reflection boundary onto the image-side CR planar reflection boundary, and the image-side CR planar reflection boundary is oriented to reflect light from the image-side inward facing parabolic mirror surface in parallel and form the image of the object on the image-side of the cloaking device.

4. The cloaking device of claim 2, wherein the object-side inward facing parabolic mirror surface focuses incident light from the object-side CR planar reflection boundary to a focal line, wherein the outward facing mirror surface of the centrally positioned planar reflection boundary is positioned at the focal line.

5. The cloaking device of claim 2, wherein the image-side inward facing parabolic mirror surface focuses diverging light reflected from the outward facing mirror surface of the centrally positioned planar reflection boundary.

6. The cloaking device of claim 1, wherein the outward facing mirror surface of the centrally positioned planar reflection boundary is oriented 45° from the outward facing mirror surface of the object-side CR planar reflection boundary and the outward facing mirror surface of the image-side CR planar reflection boundary is oriented 45° from the outward facing mirror surface of the centrally positioned planar reflection boundary.

7. The cloaking device of claim 1, wherein the outward facing mirror surface of the centrally positioned planar reflection boundary is oriented parallel to the apex axis.

8. The cloaking device of claim 1, further comprising
a pair of object-side CR planar reflection boundaries, each of the pair of object-side CR planar reflection boundaries comprising an outward facing mirror surface and an inward facing surface;
a pair of image-side CR planar reflection boundaries, each of the pair of image-side CR planar reflection boundaries comprising an outward facing mirror surface and an inward facing surface;
at least one pair of exterior curved reflection boundaries, each of the at least one pair of exterior curved reflection boundaries comprising an inward facing mirror surface spaced apart from the object-side CR planar reflection boundary and the image-side CR planar reflection boundary;
a pair of centrally positioned planar reflection boundaries, each of the pair of centrally positioned planar reflection boundaries comprising an outward facing mirror surface positioned between and facing the inward facing mirror surface of the at least one exterior curved reflection boundary;
wherein light from the object positioned on the object-side of the cloaking device and obscured by the cloaking region is reflected by the pair of object-side CR planar reflection boundaries, the at least one pair of exterior curved reflection boundaries, the pair of centrally positioned planar reflection boundaries and the pair of image-side CR planar reflection boundaries around the cloaking region to form the image of the object on the image-side of the cloaking device.

9. A cloaking device assembly comprising:
an object-side, an image-side and an apex axis extending from the object-side to the image-side;
a pair of object-side cloaking region (CR) planar reflection boundaries comprising a first object-side CR planar reflection boundary positioned on a first side of the apex axis and a second object-side CR planar reflection boundary positioned on a second side of the apex axis opposite the first side, wherein each of the pair of object-side CR planar reflection boundaries comprises an outward facing mirror surface and an inward facing surface;

a pair of image-side CR planar reflection boundaries comprising a first image-side CR planar reflection boundary positioned on the first side of the apex axis and a second image-side CR planar reflection boundary positioned on the second side of the apex axis opposite the first side, wherein each of the pair of image-side CR planar reflection boundaries comprises an outward facing mirror surface and an inward facing surface;

a cloaking region bounded by the inward facing surfaces of the pair of object-side CR planar reflection boundaries and the pair of image-side CR planar reflection boundaries;

at least one pair of exterior curved reflection boundaries comprising a first exterior curved reflection boundary positioned on the first side of the apex axis and a second exterior curved reflection boundary positioned on the second side of the apex axis opposite the first side, wherein each of the at least one pair of exterior curved reflection boundaries comprises an inward facing mirror surface spaced apart from each of the pair of object-side CR planar reflection boundaries and the pair of image-side CR planar reflection boundaries;

a pair of centrally positioned planar reflection boundaries comprising a first centrally positioned planar reflection boundary positioned on the first side of the apex axis and a second centrally positioned planar reflection boundary positioned on the second side of the apex axis opposite the first side, wherein each of the pair of centrally positioned planar reflection boundaries comprises an outward facing mirror surface positioned between and facing the inward facing mirror surface of the each of the at least one pair of exterior curved reflection boundaries;

wherein light from an object positioned on the object-side of the cloaking device assembly and obscured by the cloaking region is reflected by the pair of object-side CR planar reflection boundaries, the at least one pair of exterior curved reflection boundaries, the pair of centrally positioned planar reflection boundaries and the pair of image-side CR planar reflection boundaries around the cloaking region to form an image of the object on the image-side of the cloaking device assembly such that the light from the object appears to pass through the cloaking region.

10. The cloaking device assembly of claim 9, wherein the at least one pair of exterior curved reflection boundaries each comprise:

an object-side inward facing parabolic mirror surface positioned proximate to and facing the outward facing mirror surfaces of the pair of object-side CR planar reflection boundaries;

an image-side inward facing parabolic mirror surface positioned proximate to and facing the outward facing mirror surfaces of the pair of image-side CR planar reflection boundaries.

11. The cloaking device assembly of claim 10, wherein the pair of object-side CR planar reflection boundaries are oriented to reflect incident light from the object positioned on the object side of the cloaking device assembly in parallel onto the pair of object-side inward facing parabolic mirror surfaces, the pair of object-side inward facing parabolic mirror surfaces are oriented to reflect and focus light from the pair of object-side CR planar reflection boundaries onto the pair of outward facing mirror surfaces of the pair of centrally positioned planar reflection boundaries, the pair of outward facing mirror surfaces of the pair of centrally positioned planar reflection boundaries are oriented to reflect light from the pair of object-side inward facing parabolic mirror surfaces onto the pair of image-side inward facing parabolic mirror surfaces, the pair of image-side inward facing parabolic mirror surfaces are oriented to reflect and focus light from the pair of outward facing mirror surfaces of the pair of centrally positioned planar reflection boundaries in parallel onto the pair of image-side CR planar reflection boundaries, and the pair of image-side CR planar reflection boundaries are oriented to reflect light from the pair of image-side inward facing parabolic mirror surfaces and form the image of the object on the image-side of the cloaking device assembly.

12. The cloaking device assembly of claim 10, wherein the pair of object-side inward facing parabolic mirror surfaces are oriented to focus incident light from the pair of object-side CR planar reflection boundaries to a pair of focal lines, wherein the pair of outward facing mirror surfaces of the pair of centrally positioned planar reflection boundaries are positioned at the pair of focal lines.

13. The cloaking device assembly of claim 10, wherein the pair of image-side inward facing parabolic mirror surfaces focus diverging light reflected from the pair of outward facing mirror surfaces of the pair of centrally positioned planar reflection boundaries.

14. The cloaking device assembly of claim 9, wherein the outward facing mirror surfaces of the pair of centrally positioned planar reflection boundaries are oriented 45° from the outward facing mirror surfaces of the pair of object-side CR planar reflection boundaries, and the outward facing mirror surfaces of the pair of image-side CR planar reflection boundaries are oriented 45° from the outward facing mirror surfaces of the pair of centrally positioned planar reflection boundaries.

15. The cloaking device assembly of claim 9, wherein the outward facing mirror surfaces of the pair of centrally positioned planar reflection boundaries are oriented parallel to the apex axis.

16. A vehicle comprising:

an A-pillar;

a cloaking device comprising:

object-side, an image-side, and an apex axis extending from the object-side to the image-side;

an object-side cloaking region (CR) planar reflection boundary comprising an outward facing mirror surface and an inward facing surface and an image-side CR planar reflection boundary comprising an outward facing mirror surface and an inward facing surface;

a cloaking region bounded by the inward facing surfaces of the object-side CR planar reflection boundary and the image-side CR planar reflection boundary, wherein the A-pillar is positioned within the cloaking region; and at least one exterior curved reflection boundary comprising an inward facing mirror surface spaced apart from the object-side CR planar reflection boundary and the image-side CR planar reflection boundary;

a centrally positioned planar reflection boundary comprising an outward facing mirror surface;

wherein light from an object positioned on the object-side of the cloaking device and obscured by the cloaking region is reflected by the object-side CR planar reflection boundary, the at least one exterior curved reflection boundary, the centrally positioned planar reflection boundary and the image-side CR planar reflection boundary around the A-pillar to form an image of the object on the image-side of the cloaking device such that the light from the object appears to pass through the A-pillar.

17. The vehicle of claim 16, wherein the at least one exterior curved reflection boundary comprises an object-side inward facing parabolic mirror surface positioned proximate to and facing the outward facing mirror surface of the object-side CR planar reflection boundary and an image-side inward facing parabolic mirror surface positioned proximate to and facing the outward facing mirror surface of the image-side CR planar reflection boundary.

18. The vehicle of claim 17, wherein the object-side inward facing parabolic mirror surface is oriented to focus incident light from the object-side CR planar reflection boundary to a focal line, wherein the outward facing mirror surface of the centrally positioned planar reflection boundary is positioned at the focal line.

19. The vehicle of claim 16, wherein the outward facing mirror surface of the centrally positioned planar reflection boundary is oriented 45° from the outward facing mirror surface of the object-side CR planar reflection boundary, and the outward facing mirror surface of the image-side CR planar reflection boundary is oriented 45° from the outward facing mirror surface of the centrally positioned planar reflection boundary.

20. The vehicle of claim 16, wherein the outward facing mirror surface of the centrally positioned planar reflection boundary is oriented parallel to the apex axis.

* * * * *